(12) United States Patent
Carter et al.

(10) Patent No.: US 11,133,576 B2
(45) Date of Patent: Sep. 28, 2021

(54) RECTENNA

(71) Applicant: Aeternum, LLC, Dulles, VA (US)

(72) Inventors: Paul Carter, Dulles, VA (US); Yi Huang, Liverpool (GB); Chaoyun Song, Birkenhead (GB)

(73) Assignee: Aeternum, LLC, Dulles, VA (US)

( * ) Notice: Subject to any disclaimer, the term of this patent is extended or adjusted under 35 U.S.C. 154(b) by 507 days.

(21) Appl. No.: 15/688,157

(22) Filed: Aug. 28, 2017

(65) Prior Publication Data

US 2019/0067802 A1 Feb. 28, 2019

(51) Int. Cl.

| H01Q 1/24 | (2006.01) |
|---|---|
| H01Q 5/364 | (2015.01) |
| H01Q 9/04 | (2006.01) |
| H02J 50/20 | (2016.01) |
| H02J 7/02 | (2016.01) |

(52) U.S. Cl.
CPC ............. *H01Q 1/248* (2013.01); *H01Q 5/364* (2015.01); *H01Q 9/045* (2013.01); *H01Q 9/0421* (2013.01); *H01Q 9/0442* (2013.01); *H02J 7/025* (2013.01); *H02J 50/20* (2016.02)

(58) Field of Classification Search
CPC .. H01Q 1/24; H01Q 5/364; H01Q 9/04; H02J 50/12; H02J 50/80; H02J 50/90; H02J 50/20; H02J 50/60; H02J 50/70
USPC ........................................................ 307/104
See application file for complete search history.

(56) References Cited

U.S. PATENT DOCUMENTS

| 4,079,268 A * | 3/1978 | Fletcher ................. H01Q 1/248 307/151 |
|---|---|---|
| 5,867,131 A | 2/1999 | Camp, Jr. et al. |
| 7,084,605 B2 | 8/2006 | Mickle et al. |
| 7,145,517 B1 | 12/2006 | Cheng |
| 7,268,517 B2 | 9/2007 | Rahmel et al. |
| 7,400,253 B2 | 7/2008 | Cohen |
| 7,528,698 B2 | 5/2009 | Mickle et al. |

(Continued)

FOREIGN PATENT DOCUMENTS

| GB | 2547209 A | 8/2017 |
|---|---|---|
| JP | 2006074188 A | 3/2006 |

(Continued)

OTHER PUBLICATIONS

Wang, et al., "RF Energy Harvesting with Broadband Antenna", ITEC Asia-Pacific 2014 1569942867, 5 pages.

(Continued)

*Primary Examiner* — Rexford N Barnie
*Assistant Examiner* — Jagdeep S Dhillon
(74) *Attorney, Agent, or Firm* — Banner & Witcott, Ltd.

(57) ABSTRACT

A rectenna for high efficiency RF-to-DC wireless energy harvesting that includes an off-center-fed patch (OCFP) antenna and a rectifying circuit. The input impedance of the antenna may be tunable and directly conjugate matched to an impedance of the rectifying circuit over a wide range of frequencies and/or under different operating conditions. An impedance matching network required by rectenna systems may therefore be eliminated using the methods disclosed for the design and implementation of the OCFP rectenna. The OCFP rectenna offers consistently high RF-to-DC power conversion efficiency over a wide range of frequencies and under different operating conditions.

21 Claims, 32 Drawing Sheets

(56) References Cited

U.S. PATENT DOCUMENTS

| | | | |
|---|---|---|---|
| 7,907,899 B1 | 3/2011 | Oliver | |
| 7,956,572 B2 | 6/2011 | Zane et al. | |
| 8,035,335 B2 | 10/2011 | Duron et al. | |
| 8,045,947 B2 | 10/2011 | Mandal et al. | |
| 8,115,683 B1 | 2/2012 | Stefanakos et al. | |
| 8,130,164 B2 | 3/2012 | Semonov et al. | |
| 8,330,298 B2 | 12/2012 | Scherbenski et al. | |
| 8,362,745 B2 | 1/2013 | Tinaphong | |
| 8,847,824 B2 | 9/2014 | Kotter et al. | |
| 8,860,617 B1 | 10/2014 | Fenick | |
| 8,878,742 B1 | 11/2014 | Jenn | |
| 8,906,523 B2 | 12/2014 | Brantner | |
| 8,968,296 B2 | 3/2015 | McPherson | |
| 9,197,143 B1 | 11/2015 | Townsend et al. | |
| 9,318,898 B2 | 4/2016 | John | |
| 9,472,849 B2 | 10/2016 | Shin et al. | |
| 9,966,656 B1* | 5/2018 | Carter | H01Q 1/248 |
| 2006/0022891 A1* | 2/2006 | O'Neill, Jr. | H01Q 11/08 343/895 |
| 2007/0087719 A1* | 4/2007 | Mandal | H01Q 1/248 455/299 |
| 2008/0180216 A1* | 7/2008 | Choi | H01Q 1/362 340/10.1 |
| 2009/0102296 A1 | 4/2009 | Greene et al. | |
| 2009/0117872 A1 | 5/2009 | Jorgenson et al. | |
| 2009/0152954 A1 | 6/2009 | Le et al. | |
| 2009/0174361 A1 | 7/2009 | Duron et al. | |
| 2009/0256769 A1 | 10/2009 | Kan et al. | |
| 2011/0062336 A1* | 3/2011 | Ben-Bassat | H01L 31/09 250/338.4 |
| 2011/0101789 A1* | 5/2011 | Salter, Jr. | H02M 7/217 307/104 |
| 2012/0106103 A1 | 5/2012 | Nohra | |
| 2012/0176289 A1 | 7/2012 | Lee | |
| 2013/0249771 A1* | 9/2013 | Kotter | H01Q 1/248 343/893 |
| 2013/0321214 A1 | 12/2013 | Zhou et al. | |
| 2014/0266967 A1 | 9/2014 | Ramahi et al. | |
| 2014/0290950 A1 | 10/2014 | Welsh et al. | |
| 2014/0361629 A1 | 12/2014 | Moon et al. | |
| 2015/0048682 A1 | 2/2015 | Murley | |
| 2015/0214927 A1* | 7/2015 | Greene | H02J 1/00 307/104 |
| 2015/0229165 A1 | 8/2015 | Hanein et al. | |
| 2015/0236551 A1 | 8/2015 | Shearer et al. | |
| 2015/0256097 A1 | 9/2015 | Gudan et al. | |
| 2015/0372541 A1 | 12/2015 | Guo et al. | |
| 2015/0380973 A1 | 12/2015 | Scheb | |
| 2016/0020636 A1 | 1/2016 | Khlat | |
| 2016/0119018 A1* | 4/2016 | Lindgren | H04B 1/52 375/219 |
| 2016/0181873 A1* | 6/2016 | Mitcheson | H01Q 1/248 307/104 |
| 2016/0191121 A1* | 6/2016 | Bell | H02J 7/00045 307/104 |
| 2016/0261031 A1 | 9/2016 | Dion et al. | |
| 2017/0018849 A1* | 1/2017 | Dumanli Oktar | H01Q 5/30 |
| 2018/0077763 A1* | 3/2018 | Schneider | A61J 9/02 |
| 2018/0159237 A1* | 6/2018 | Crouch | H01Q 21/064 |

FOREIGN PATENT DOCUMENTS

| | | |
|---|---|---|
| JP | 2015043551 A | 3/2015 |
| WO | 2015/019106 A2 | 2/2015 |
| WO | 2015062545 A1 | 5/2015 |
| WO | 2015089437 A1 | 6/2015 |
| WO | 2016001020 A1 | 1/2016 |

OTHER PUBLICATIONS

Krishnan, et al., "Design and development of batch fabricatable metal-insulator-metal diode and mircostrip slot antenna as rectenna elements", ResearchGate, Article in Sensors and Actuators A Physical—Mar. 2008, 9 pages.

La Rosa, "Investigation of the Rectenna Concept for Millimeter Wave Applications", Graduate Theses and Dissertations, University of South Florida, Scholar Commons, 2007, 151 pages.

Keyrouz, et al., "Efficient Direct-Matching Rectenna Design for RF Power Transfer Applications", 5 pages.

Zhang, et al., "Design of a Compact Planar Rectenna for Wireless Power Transfer in the ISM Band", Research Article, Hindawi Publishing Corporation, International Journal of Antennas and Propagation, vol. 2014, Article ID 298127, 9 pages, <http://dx.doi.org/10.1155/2014/298127>, published Feb. 20, 2014, 10 pages.

S. Kim, et al., "Ambient RF Energy-Harvesting Technologies for Self-Sustainable Standalone Wireless Sensor Platforms," Proc. IEEE, vol. 102, No. 11, pp. 1649-1666, Nov. 2014.

J.O. McSpadden, et al., "Design and Experiments of a High Conversion Efficiency 5.8-GHz Rectenna," IEEE Trans. Microw. Theory Tech., vol. 46, No. 12, pp. 2053-2060, Dec. 1998.

H. Sun, et al., "A Dual-Band Rectenna Using Broadband Yago Antenna Array for Ambient RF Power Harvesting," IEEE Antennas and Wireless Propa. Lett., vol. 12, pp. 918-921, 2013.

D. Masotti, et al., "Genetic-Based Design of a Tetra-Band High-Efficiency Radio-Frequency Energy Sytem," Microw. Antennas Propag., vol. 7, No. 15, pp. 1254-1263, Jun. 2013.

K. Niotaki, et al., "A Compact Dual-Band Rectenna Using Slot-Loaded Dual Bandfolded Dipole Antenna," IEEE Antennas and Wireless Propa. Lett. vol. 12, pp. 1634-1637, 2013.

J.A. Hagerty, et al., "Recycling Ambient Microwave Energy with Broad-Band Rectenna Arrays," IEEE Trans. Microw. Theory Tech., vol. 52, No. 3, pp. 1014-1024, Mar. 2004.

V. Kuhn, et al., "A Multi-Band Stacked RF Energy Harvester with RF-to-DC Efficiency Up to 84%," IEEE Trans., Microw. Theory Tech., vol. 63, No. 5, pp. 1768-1778, May 2015.

C. Song, et al., "A High-Efficiency Broadband Rectenna for Ambient Wireless Energy Harvesting," IEEE Trans. Antennas Propag., vol. 63, No. 8, pp. 3486-3495, May 2015.

C. Song, et al., "A Novel Six-Band Dual CP Rectenna Using Improved Impedance Matching Technique for Ambient RF Energy Harvesting," IEEE Trans. Antennas Propag., May 2016.

Feb. 23, 2018—(EP) Communication and European Search Report—App EP17193424.

May 5, 2016—Okba, et al., "Multiband Rectanna for Microwave Applications," 2016 IEEE Wireless Power Transfer Conference (WPTC), IEEE, pp. 1-4.

Dec. 22, 2014—Chen, et lal., "Bowtie Nanoantennas with Symmetry Breaking," Journal of Nanophotonics, Society of Photo-Optical Instrumentation Engineers, vol. 9, No. 1, p. 93798.

Aug. 7, 2012—Sun, et al., "Design of a High-Efficiency 2.45-GHz Rectenna for Low-Input-Power Energy Harvesting," IEEE Antennas and Wireless Propagation Letters, IEEE, vol. 11, pp. 929-932.

Mar. 31, 2008—Qu, et al., "Wideband Periodic Endfire Antenna With Bowtie Dipoles," IEEE Antennas and Wireless Propagation Letters, vol. 7, pp. 314-317.

Sep. 25, 2012—Ta, et al., "Dual-band Printed Dipole Antenna with Wide Beamwidth for WLAN Access Points," Microwave and Optical Technology Letters, vol. 54, No. 12, pp. 2806-2811.

Jan. 16, 2019—(EP) Communication and European Search Report—App 18190837.7.

Apr. 1, 2016—Zhang, et al., "Patch Antennas With Loading of a Pair of Shorting Pins Toward Flexible Impedance Matching and Low Cross Polarization", IEEE Transactions on Antennas and Propagation, IEEE Service Center, Piscataway, NJ, US, vol. 64, No. 4, pp. 1226-1233, XP011605394, ISSN: 0018-926X, DOI: 10.1109/tap.2016.2526079 [retrieved on Apr. 5, 2016].

Mar. 12, 2020—(EP)—Summons to Attend Oral Proceedings—App 17193424.3.

Knight, David, "Diode Detectors for RF Measurement art 1: Rectifier circuits, theory and calculation procedures," Jan. 1, 2005, retrieved from the Internet http://g3ynh.info/circuits/Diode_det.pdf.

* cited by examiner

200

210

220

RECTENNA

BACKGROUND

Wireless power transfer (WPT) (e.g., converting electromagnetic energy such as microwave, radio frequency (RF), etc., to direct-current (DC) power), has been used in applications such as RF identification (RFID) and microwave energy powered unmanned aerial vehicle (UAVs). In recent years, due to the significant development in wireless communications, (e.g., cellular networks, wireless local area networks, etc.) wireless transmitters are conveying increasing amounts of electromagnetic energy over intervening space to various receivers (e.g., cellular base stations, wireless devices, antennas, etc.). Ambient wireless energy harvesting, which collects energy from electromagnetic waves in the environment, is a favorable technology for supplying continuous power to some self-sustainable standalone platforms (e.g., wireless sensors, smoke alarms, health monitors, etc.).

SUMMARY

Embodiments herein relate to high-efficiency, adaptive rectifying antennas (rectennas) for wireless power transfer that provide tunable load impedances and operation over varying input power levels. Some aspects of the disclosure are directed to broadband antennas (also known as wideband antennas), rectifying circuits or rectifiers, and techniques for eliminating impedance matching networks connected between the broadband antennas and the rectifying circuits.

Various embodiments are provided for achieving high RF-to-DC power conversion efficiencies over a wide range of frequencies and varying input power levels without a need for complex impedance matching networks connected between the antennae and the rectifying circuits.

Various embodiments are provided for achieving high RF-to-DC power conversion efficiencies with the antenna and feed line directly impedance matched to a rectifying circuit.

According to various aspects, methods are provided for achieving adaptive rectennas with tunable impedances for varying input power levels and load impedances while maintaining high RF-to-DC power conversion efficiencies.

According to various aspects, methods are provided for simplifying broadband rectenna structures to make them compact, lightweight, low cost and compatible with printed circuit board-level integration.

According to various aspects, a structure for receiving electromagnetic (EM) radiation, for example, RF signals and accomplishing rectification of the received RF signals is disclosed. In some aspects, the connectible rectifying diode may be replaceable with various rectifying elements without sacrificing the high RF-to-DC power conversion efficiencies. In some embodiments, load impedance values may be well matched to the broadband rectenna such that the high RF-to-DC power conversion efficiency of the broadband rectenna may be maintained at different input power levels and different load values.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skills in the art from the detailed description.

BRIEF DESCRIPTION OF THE DRAWINGS

Embodiments are herein described, by way of example only, with reference to the accompanying drawings, wherein.

DETAILED DESCRIPTION

Figure 1A:
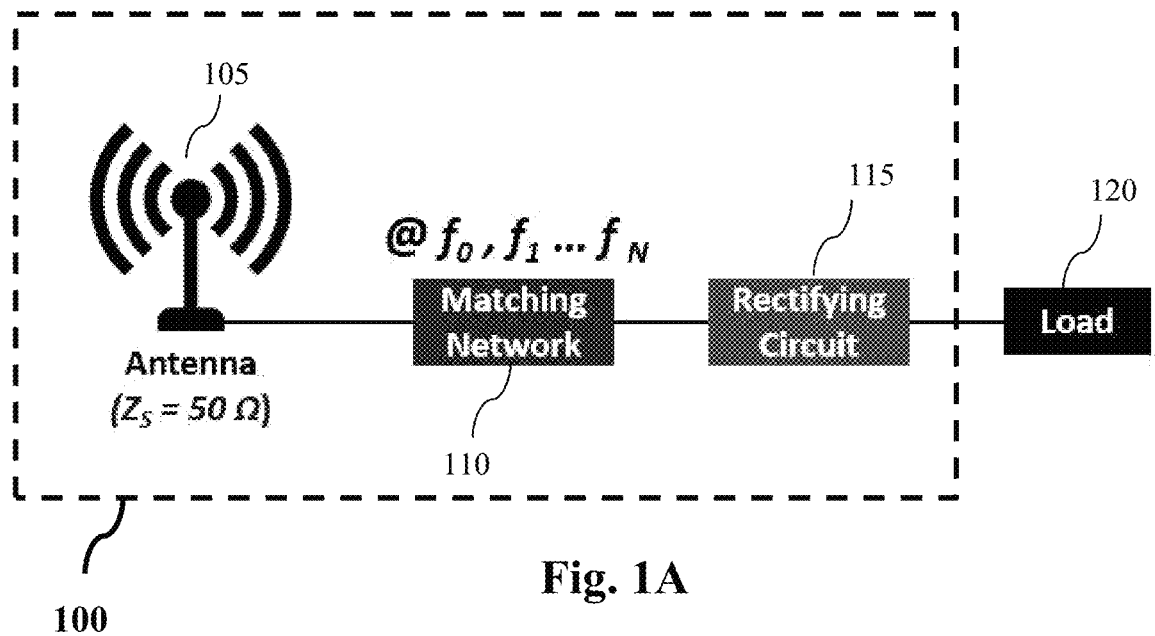
FIG. 1A illustrates a rectifying antenna (rectenna) system.

Reference will now be made in detail to features of the embodiments, examples of which are illustrated in the accompanying drawings, wherein like reference numerals refer to the like elements throughout. The features are described below to explain the embodiments by referring to the figures. The term "and/or" includes any and all combinations of one or more of the associated listed items.

Hereinafter, description will be given of embodiments disclosed herein in more detail with reference to the accompanying drawings. In describing various aspects, the same component on different drawings may be designated by the same reference numeral, and repetitive description of the same component will be omitted.

Single-band rectennas may be capable of receiving EM radiation (e.g., RF signals) over a narrow frequency band and converting the received narrowband RF power to DC power. The DC power may be used to power devices (e.g., RFID devices, wireless chargers, electric vehicles, Internet of Things (IoT) based smart devices, unmanned aerial vehicles, energy storage devices, etc.). Multi-antenna and/or broadband antenna energy harvesting systems may combine the output power from different single-band antennas, each of which have a single operating frequency, an associated impedance matching network and a rectifying circuit. The requirement for the multi-band and broadband rectennas to have corresponding broadband and multi-band impedance matching networks increases costs and weight, reduces efficiency, and introduces performance variations associated with complexities of the impedance matching networks.

Moreover, due to a non-linearity of operation of the rectifying circuit, the performance of broadband and multi-band rectennas using complex impedance matching networks is very sensitive to varying operating conditions, such as varying input power levels and varying loads.

FIG. 1A illustrates a rectenna system 100 connected to a load. The rectenna system 100 may consist of a receiving antenna 105 that connects to a rectifier and/or a rectifying circuit 115 via an impedance matching network 110. The rectenna system 100 may connect to a load 120. The load 120 may have an impedance or resistance value. For example, the load 120 may be a resistor, a super capacitor, a DC-DC boost converter, or an energy storage device. In some embodiments, the rectifying circuit may include a single shunt diode rectifier, which may include one or more shunt diodes and a low pass filter that may be connected to the load 120. The diode may be a Schottky GaAs diode. The low pass filter may be a shunt capacitor configured to reduce a peak-to-peak ripple voltage output from the rectifying circuit so that a stable DC power may be supplied to the load 120. The impedance matching network 110 connected between the antenna 105 and the rectifying circuit 115 may affect the operating frequency, the RF-to-DC power conversion efficiency and/or the complexity of the rectenna system 100.

The impedance matching network 110 may be configured to reject higher harmonic signals generated by non-linear rectifying elements of the rectenna system 100. Higher harmonic signal rejection by the impedance matching network 110 may prevent losses associated with the higher harmonic signals that may be re-radiated by the antenna 100 as power lost.

Figure 1B:
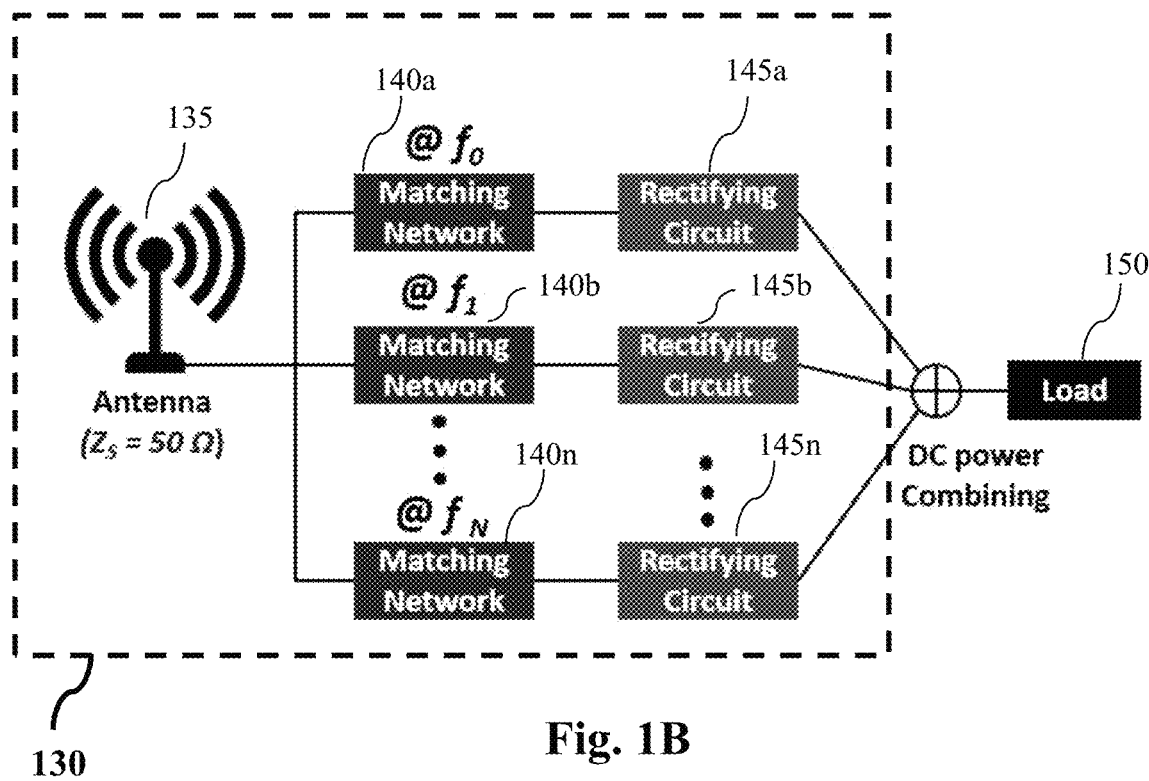
FIG. 1B illustrates a multiband rectenna system with separate matching networks and rectifying circuits.

FIG. 1B illustrates a multiband rectenna system 130 with separate multi-branch matching networks 140a, 140b, . . . 140n and rectifying circuits 145a, 145b, . . . 145n. Each branch network of the multi-branch matching networks may be designed for a particular operating frequency. The output DC power from each rectifying circuit (e.g., each of the rectifying circuits 145a, 145b, . . . 145n) of the multiband rectenna system may be combined at an output port before delivery to a load 150. The multiband rectenna system 130 (e.g., the combination of the antenna 135, the matching networks 140a, 140b, . . . 140n and the rectifying circuits 145a, 145b, . . . 145n) requires a larger number of circuit components and a complex design to accommodate different matching networks and rectifying circuits.

In addition, the aforementioned rectenna systems (e.g., the rectenna systems 100 and/or 130) that comprise matching networks may use antennas matched to a standard 50Ω port. Thus, the matching networks (e.g., the matching network 110, 140a . . . 140n) match the complex high impedance of the rectifying circuits (e.g., the rectifying circuit 115, 145a . . . 145n) to the 50Ω port. In this scenario, the performance of the rectenna systems may be very sensitive to impedance variations (e.g., 0Ω to 300Ω for resistance, −500 jΩ to −200 jΩ for reactance, etc.) of the rectifying circuits and it may be difficult to achieve consistent conversion efficiency under different operating conditions (e.g., varying input power levels, varying input frequencies, varying load impedances, etc.) due to the impedance variations and impedance mismatch occurring between the antennae and the rectifying circuits.

Figure 1C:
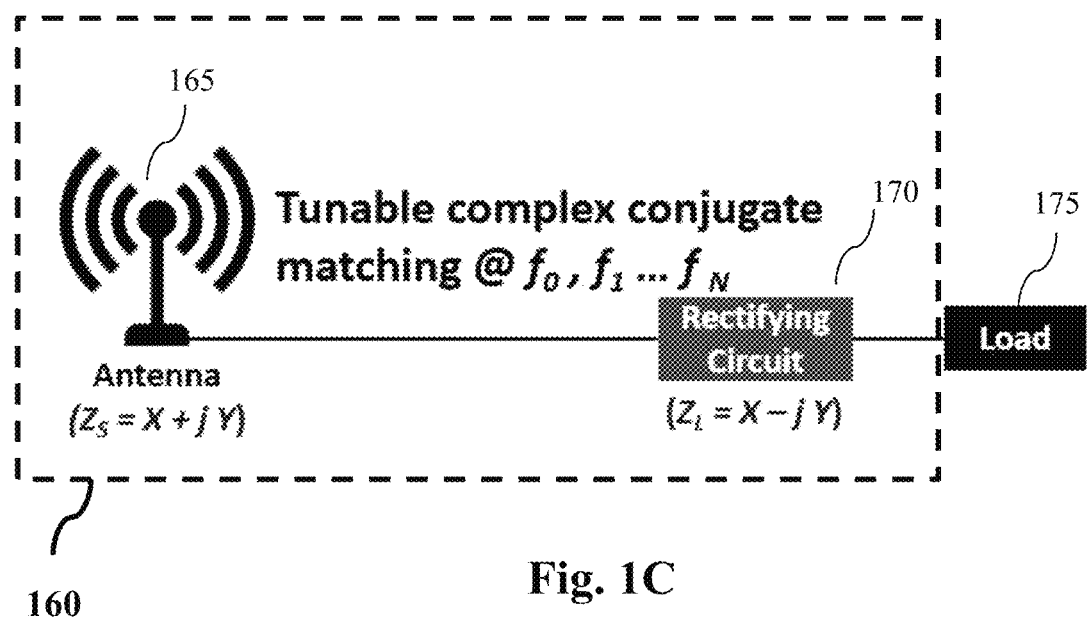
FIG. 1C illustrates a configuration view of a rectenna system according to various embodiments that avoids matching networks.

FIG. 1C illustrates a rectenna 160 according to various embodiments. The rectenna 160 may comprise a receiving antenna 165 connected to a rectifying diode and/or rectifying circuit 170. The rectifying circuit 170 may be configured to convert an alternating current (AC) generated by the antenna 165 into DC. The antenna 165 may be connected to the rectifying circuit 170 directly (e.g., without an intervening matching network). A load 175 may be connected to the rectenna 160 (e.g., the combination of the antenna 165 and the rectifying circuit 170).

The antenna impedance ($Z_S$) may be directly matched (e.g., complex conjugate matches) with the rectifying circuit impedance ($Z_L$) at several desired frequency bands, as illustrated in FIG. 1C. Thus, the adaptive rectenna is of a relatively simple structure, a compact size and low cost. The elimination of a matching network significantly reduces the nonlinear effects (e.g., impedance mismatch caused by rectifier input impedance variations) otherwise associated with the rectenna systems of FIGS. 1A and 1B. Further, reduction in the nonlinear effects associated with the impedance matched and directly connected the antenna 165 and the rectifying circuit 170, of the adaptive rectenna 160 of FIG. 1C, avoids reductions in the conversion efficiencies that may be otherwise associated with the rectenna systems of FIGS. 1A and 1B.

Figure 2A:
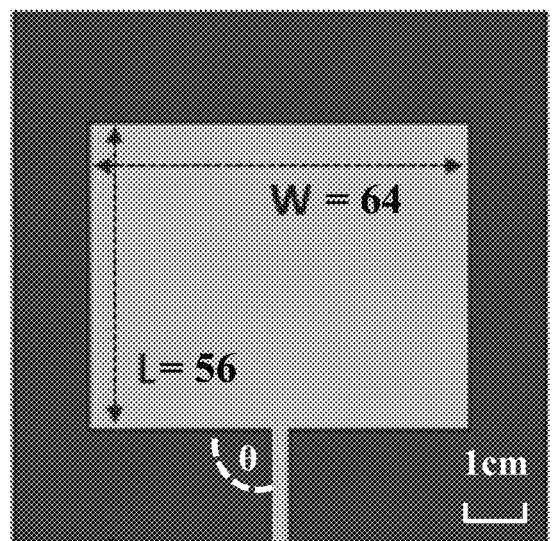
FIG. 2A illustrates a center-fed patch antenna according to various embodiments.

FIG. 2A illustrates a to-scale representation of a center-fed microstrip patch (CFP) antenna 200 operating at approximately 1.85 GHz, of width W approximately 64 mm and length L approximately 56 mm. In some instances, the width W of the CFP antenna 200 may approximately equal the length L of the CFP antenna 200 (e.g., W=L=64 mm). The width W and the length L may be calculated based on a desired operating frequency (e.g., approximately 1.85 GHz) and a dielectric constant (e.g., approximately 2.2) for a substrate on which the CFP antenna 200 is disposed. The parameters of width W and length L may be modified based on patch antenna design equations for other operating frequencies (e.g., operating frequencies ranging from approximately 1.5 GHz up to 2.8 GHz, etc.) of interest. The parameters of width W and length L may be modified based on the patch antenna design equations for a selected fundamental resonant frequency (such as an operating frequency of approximately 1.55 GHz, 1.85 GHz, 2.1 GHz, 2.45 GHz, etc.) supported by the CFP antenna 200, a dielectric constant of the substrate and/or a thickness of the substrate. Scaling of the width W and the length L by an integer multiple, may modify a fundamental resonant frequency (and/or operating frequency) supported by the CFP antenna. Selection of the physical dimensions of the CFP antenna may be based on determining a minimum width and a minimum length for supporting the desired resonant frequency. (e.g., the width W of around 64 mm and the length L of around 56 mm of the CFP antenna may be the minimum width and the minimum length required for supporting the resonant frequency of around 1.85 GHz). Increasing the width W of the CFP antenna 200 from 56 mm to 64 mm, for the length L of 64 mm, may shift the operating frequency of the CFP antenna 200 to lower frequencies (e.g., the operating frequency may decrease from 1.85 GHz to 1.55 GHz). The feed line of the CFP antenna 200 may be positioned in the x-y plane of the CFP antenna 200 and be approximately 3 mm in width and 15 mm in length. In some variations, physical dimensions of width and length of the feed line may vary between a range of approximately 1 mm to 5 mm for the width and a range of approximately 5 mm to 20 mm for the length. The physical dimensions of the feed line may be tuned based on estimating an insertion loss of the feed line, an impedance of the feed line, and/or influence of the impedance of the feed line on an overall impedance of the CFP antenna 200 that comprises the feed line. For example, the physical dimensions of the feed line may be tuned to minimize the insertion loss of the feed line at the selected operating frequency (e.g., 1.85 GHz), one or more operating frequencies (e.g., 1.5 GHz, 1.85 GHz, and/or 2.45 GHz), and/or fundamental resonant frequency (e.g., 1.5 GHz or 1.85 GHz). A first end of the feed line may connect to an edge of the CFP antenna 200 at a mid-point of the edge that may align with a center of the CFP antenna 200.

Figure 2B:
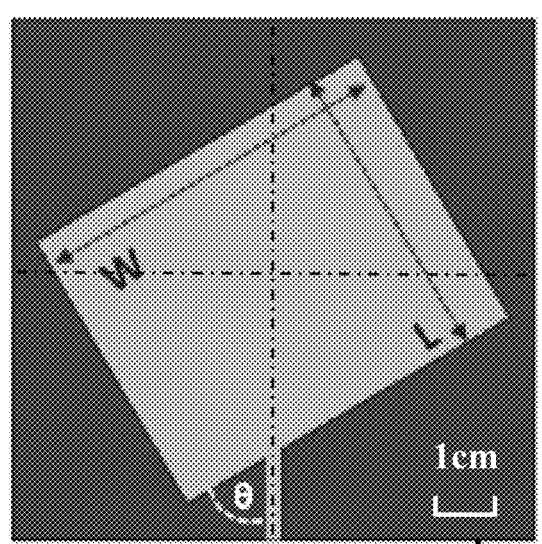
FIG. 2B illustrates an off-center-fed patch (OCFP) antenna according to various embodiments.

FIG. 2B illustrates a to-scale representation of an off-center-fed microstrip patch (OCFP) antenna 210 of width W (e.g., 64 mm) and length L (e.g., 56 mm) that includes a pitch angle, θ, between a feed line (e.g., 3 mm in width and 15 mm in length) and the OCFP antenna 210. A feed line of the OCFP antenna 210 may be positioned in the x-y plane of the OCFP antenna and may be approximately 1 mm to 5 mm in width and approximately 5 mm to 20 mm in length. In some embodiments, physical dimensions of the feed line for the OCFP antenna 210 may vary as described above with respect to the feed line for the CFP antenna 200.

The OCFP antenna may be designed based on rotating (e.g., counter-clockwise by approximately (90-θ)°, or clockwise by 0°) (e.g., with respect to a center of the patch) the CFP antenna 200, such that the feed line satisfies the pitch angle θ. The pitch angle, in some variations, may be approximately 60°. The pitch angle θ, in some other variations, may satisfy an angle between 30° and 70°. A first end of the feed line of the OCFP antenna 210 may connect to an edge of the OCFP antenna 210, such that, the feed line may align with a center of the OCFP antenna 210.

The OCFP antenna 210 may be disposed on a PCB substrate. The PCB substrate may, for example, be a Duroid® 5880 substrate made by Rogers Corporation with a relative permittivity of approximately 2.2 and a thickness of approximately 1.58 mm. In some variations, the substrate may comprise a relative permittivity varying between approximately 1.5 and 2.5 and a thickness varying between 1.2 mm and 1.8 mm. The microstrip patch on the top layer of the PCB that comprises the OCFP antenna 210 and/or the feed line may be a metal, for example, copper patch with a thickness of varying between approximately 18 μm and 70 μm. A fundamental frequency of the microstrip OCFP antenna of W=64 mm and L=56 mm may, for example, be approximately 1.84 GHz.

Figure 2C:
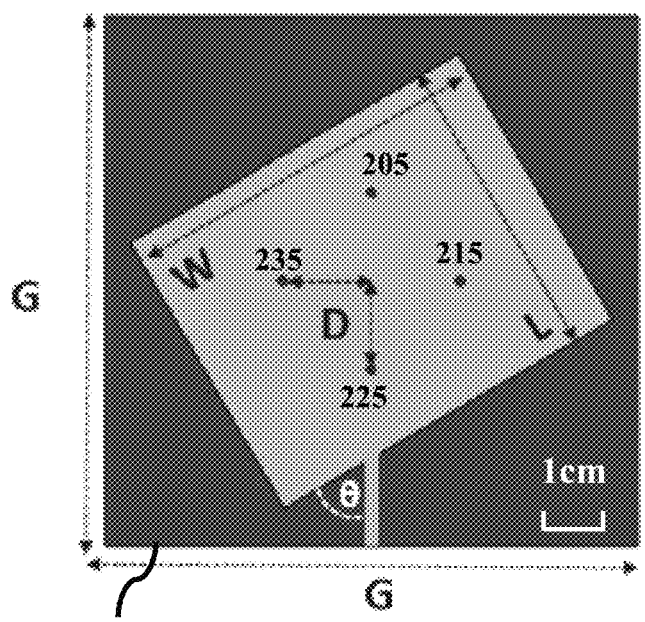
FIG. 2C illustrates an OCFP antenna with four shorting elements according to various embodiments.

FIG. 2C illustrates an OCFP antenna 220 (such as the OCFP antenna 210 of FIG. 2B) with four shorting elements (e.g., vias, conducting pins, solder balls, etc.) 205, 215, 225 and 235 that electrically connect the OCFP antenna 220 with a ground plane of the PCB on which the microstrip OCFP antenna 220 is disposed. The dimensions (e.g., width W and length L) of the OCFP antenna 220 and/or the PCB substrate on which the OCFP antenna 200 may be disposed may be similar to those of the aforementioned OCFP antenna 210. A first end of a feed line of the OCFP antenna 220 may connect to an edge of the OCFP antenna 220, such that, the feed line may align with a center of the OCFP antenna 220 and/or satisfy a predefined pitch angle θ (e.g., 60°) relative to the edge of the OCFP antenna 220. The microstrip patch on the top layer of the PCB that comprises the OCFP antenna 220 and/or the feed line may be a metal, for example, a copper patch with a thickness of varying between approximately 18 μm and 70 μm.

The shorting elements provide an electrical connection from the OCFP antenna 220 to the ground plane at particular positions in the x-y plane of the OCFP antenna. According to various embodiments, one or more shorting elements may be added to the OCFP antenna 220 in order to tune the impedance, operating power, and/or operating frequencies of the OCFP antenna 220. The positioning of the shorting elements in the x-y plane of the OCFP antenna may determine the OCFP antenna impedance, operating frequencies and/or operating power levels. In some variations, each shorting element may comprise a via or a conducting pin, approximately 0.8 mm in diameter and positioned at a predefined distance D from the center of the OCFP antenna 220. In some embodiments, the shorting elements may be positioned symmetrically in the x-y plane relative to the center of the OCFP antenna (e.g., the shorting elements may be equally spaced relative to each other and each shorting elements may be positioned at a same predefined distance D from the center of the OCFP antenna, as illustrated in FIG. 2C). The predefined distance D may be approximately 15 mm for the OCFP antenna of width W=64 mm and length L=56 mm. In some embodiments, at least one pair of the shorting elements, e.g., shorting elements 205 and 225, may align with the center of the OCFP antenna and/or align with the feed line of the OCFP antenna 220. The addition of the symmetrically positioned and/or identical shorting elements on the OCFP antenna 220 achieves tunable impedance matching with a rectifying circuit (such as the rectifying circuit 170) and modifies the operating frequency bands of the OCFP antenna 220. While this embodiment illustrates four shorting elements, other embodiments may comprise a higher or lower number of shorting elements based upon a desired range (or ranges) of operating frequencies for a particular application.

Figure 3A:
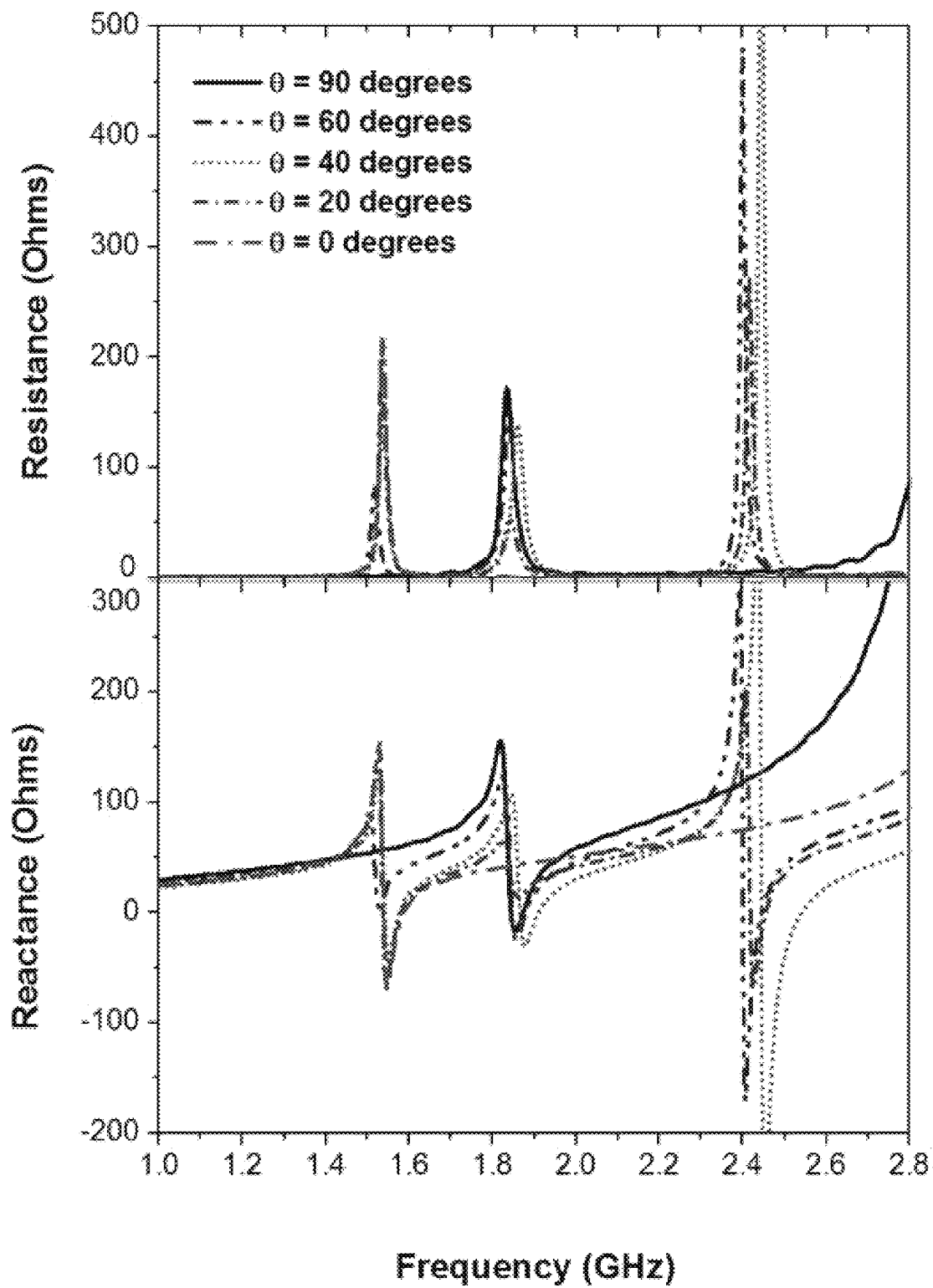
FIG. 3A plots resistance and reactance values for the OCFP antenna for varying values of pitch angle.
Figure 3B:
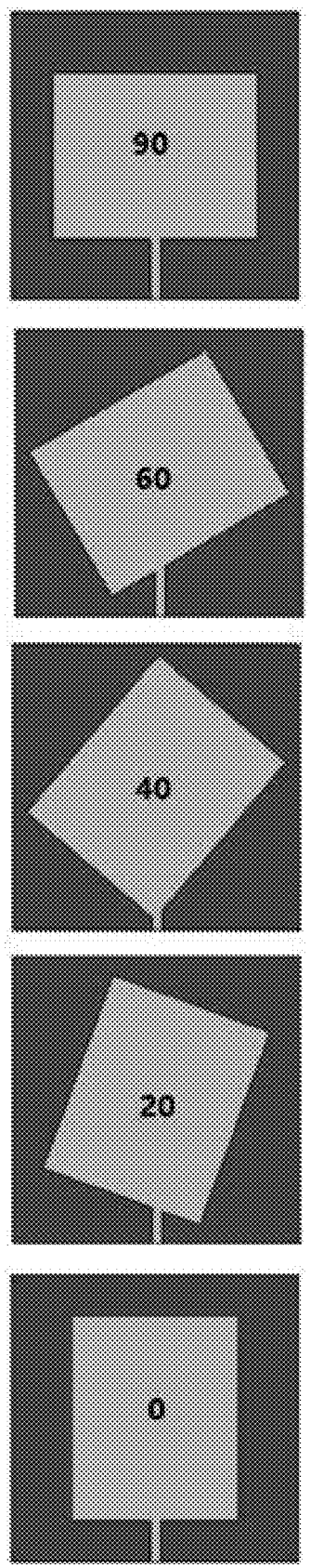
FIG. 3B illustrates schematic representations of the OCFP antenna for varying values of pitch angle.

FIG. 3A illustrates simulated resistance and reactance plots of the OCFP antenna (e.g., the OCFP antenna 210 in FIG. 2B) for varying values of the pitch angle θ. FIG. 3B illustrates schematic representations of the OCFP antenna (e.g., the OCFP antenna 210 in FIG. 2B) for varying values of the pitch angle θ. From FIGS. 3A and 3B, the OCFP antenna may support a resonant frequency (or fundamental resonant frequency) of approximately 1.85 GHz, with resistance and reactance values exceeding 100Ω, for a pitch angle θ that is approximately 90°. Decreasing the pitch angle θ from approximately 90° to approximately 60° may result in the appearance of two additional resonant frequencies at approximately 1.5 GHz and 2.4 GHz, without significant decrease in the resistance and/or reactance values (e.g., the resistance values and the reactance values exceed 100Ω), enabling multiband operation of the OCFP antenna over three frequency bands respectively centered at approximately 1.5 GHz, 1.85 GHz and 2.4 GHz. Each of the three frequency bands may comprise a bandwidth varying between 20 MHz up to 50 MHz. In some embodiments, the three resonant frequencies of approximately 1.5 GHz, 1.85 GHz and 2.4 GHz may remain nearly unchanged for reductions in the pitch angle θ from approximately 60° to approximately 20°. Highest RF-to-DC conversion efficiencies for the fundamental resonant frequency of 1.85 GHz and/or three resonant frequencies are observed for the pitch angle of approximately 60°. Reductions in the pitch angle θ from approximately 60° to approximately 20° may decrease resistance values (e.g., by 0 to 20%) and reactance values (e.g., by 0 to 20%) of the OCFP antenna as illustrated in FIG. 3A. In some embodiments, further reductions in the pitch angle θ from 20° to 0° may result in a gradual disappearance of the resonant frequencies at approximately 1.85 GHz and/or approximately 2.4 GHz, with significant reductions in the resistance values and the reactance values as illustrated by FIG. 3A. A resonant frequency at approximately 1.5 GHz may be supported for the pitch angle θ of approximately 0°. Additionally, variations in the physical dimensions (e.g., width and/or length) of the OCFP antenna may change the resonant frequencies of operation and enable multiband operation over different frequency ranges (e.g., GSM900, GSM850, LTE700, DTV 470-880, etc.).

Figure 4:
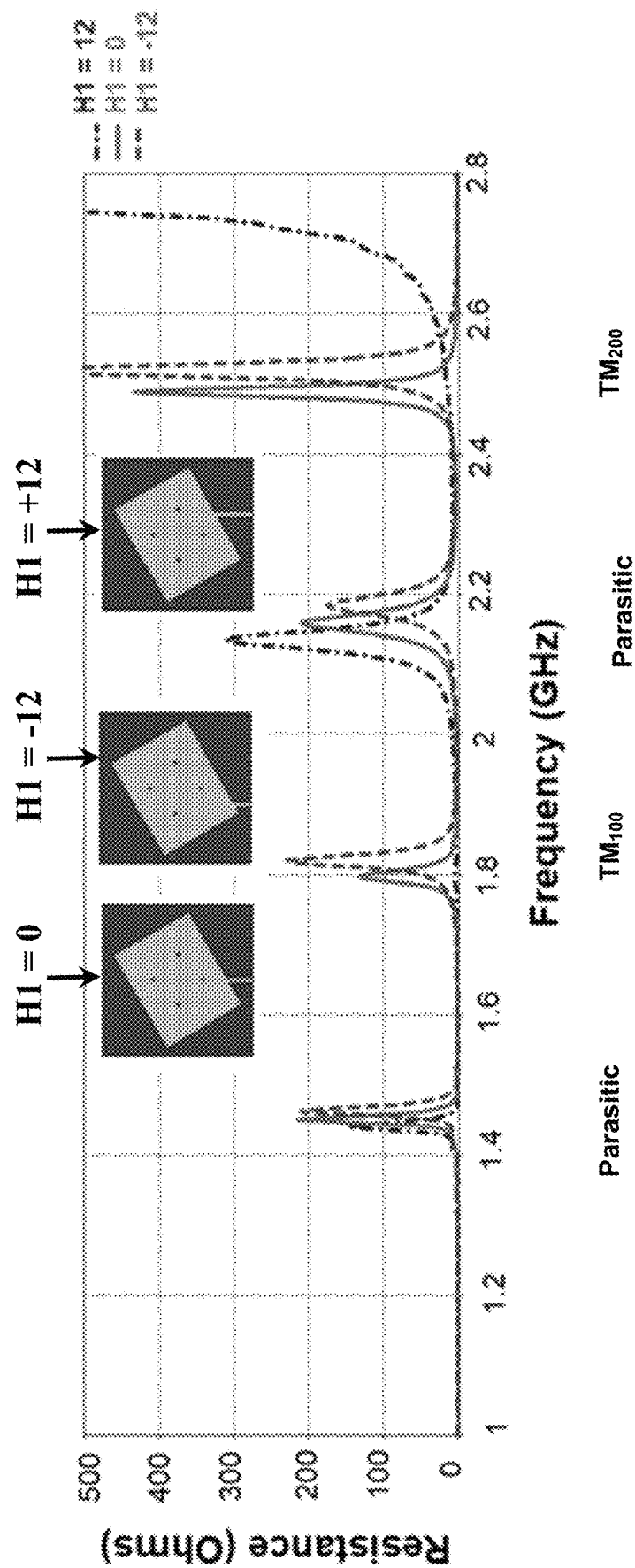
FIG. 4 illustrates variations in the positioning of a feed line along an edge of the OCFP antenna and plots resistance values of the OCFP antenna versus frequencies.

FIG. 4 illustrates variations in the positioning of the feed line of the OCFP antenna and plots corresponding variations in resistance values of the OCFP antenna versus frequencies. A shift in the feed line, as described earlier with respect to FIG. 2C, along an edge of the OCFP antenna may shift the resonant frequencies supported by the OCFP antenna and/or change a number of resonant frequencies supported by the OCFP antenna within a range of 1.0 GHz to 2.8 GHz as illustrated by FIG. 4. For example, a shift of approximately 12 mm in the positioning of the feed line along the x-axis (such as in the positive x-direction or negative x-direction away from the center of the OCFP antenna) may decrease a total number of resonant frequencies (e.g., from four resonant frequencies to three resonant frequencies) supported within the range of 1.0 GHz to 2.8 GHz or cause a shift in the supported resonant frequencies (e.g., a resonant frequency around 1.8 GHz for a $TM_{100}$ mode may shift to a higher resonant frequency around 1.85 GHz for the feed line positioned 12 mm towards the negative x-direction relative to the center of the OCFP antenna, a parasitic resonant frequency around 1.45 GHz may shift to a lower resonant frequency around 1.44 GHz after the feed line is positioned 12 mm towards the positive x-direction relative to the center of the OCFP antenna, etc.). The two parasitic modes around 1.45 GHz and 2.15 GHz may be attributed to the off-center-fed structure of the OCFP antenna.

Figure 5:
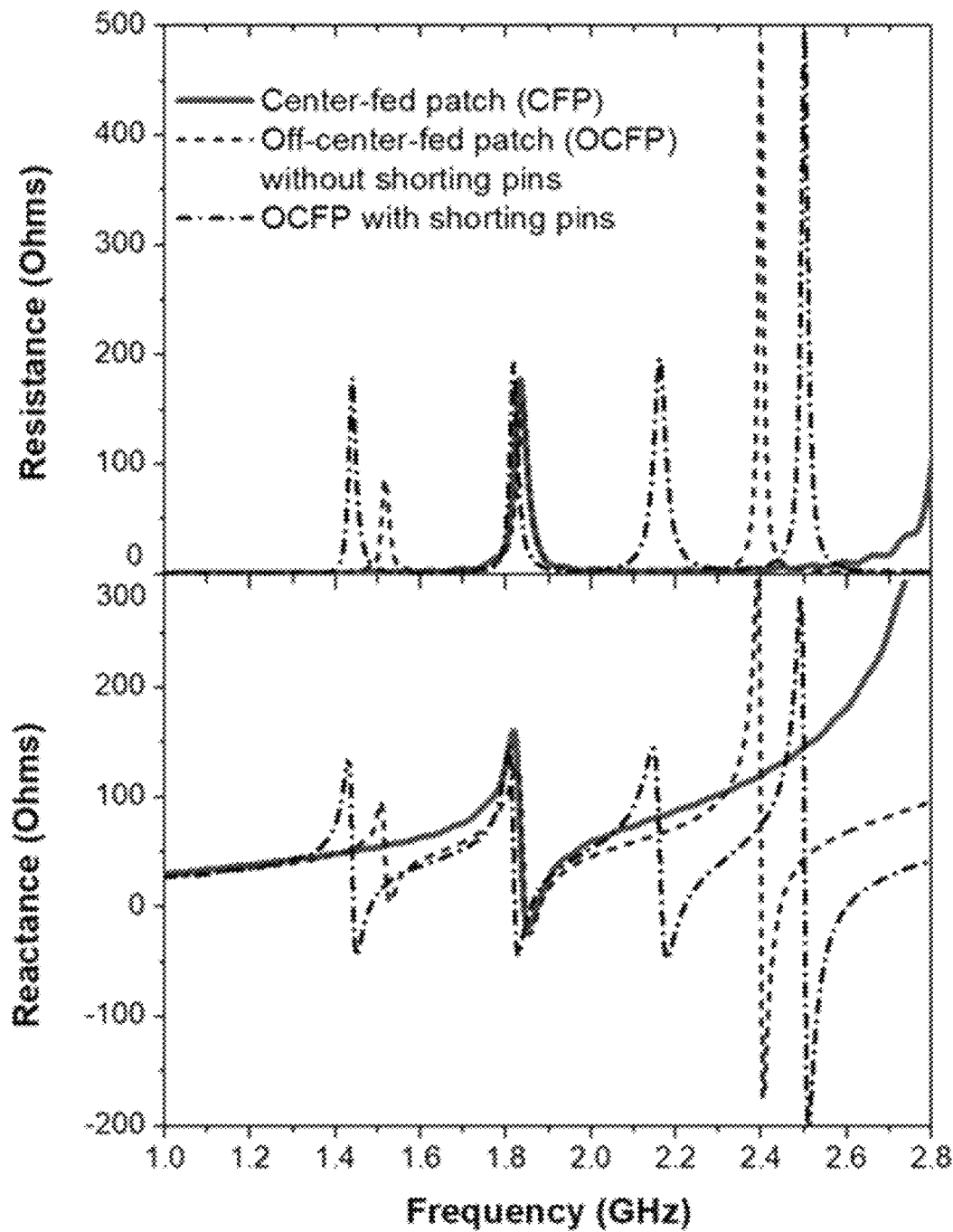
FIG. 5 illustrates a plot of the resistance and reactance values versus operating frequency of the CFP antenna, the OCFP antenna and the OCFP with shorting elements according to various embodiments.

FIG. 5 illustrates simulated resistance and reactance plots versus frequency for the CFP antenna (e.g., the CFP antenna 200 in FIG. 2A), the OCFP antenna (e.g., the OCFP antenna 210 in FIG. 2B) and the OCFP antenna with shorting elements (e.g., the OCFP antenna 220 in FIG. 2C). The antenna (the CFP antenna, the OCFP antenna without holes, the OCFP antenna with holes, the OCFP antenna with shorting elements, etc.) simulations were performed using an EM simulation software, such as CST Microwave Studio®. All three antennae demonstrate a fundamental resonant frequency at around 1.85 GHz with high resistance of approximately 200Ω at the resonant frequency and an anti-resonant frequency at approximately 1.8 GHz with reactance varying rapidly from 150Ω to −50Ω at the anti-resonant frequency. The OCFP antenna may be designed by modifying the feed line of the CFP antenna and introducing a predefined pitch angle varying from 30° up to 70° (e.g., around 60°), as illustrated in FIGS. 2B and 3A-B. The feed line modification results in the OCFP antenna supporting two additional anti-resonant frequencies at approximately 1.5 GHz and 2.4 GHz, respectively. Loading of the four shorting elements on the OCFP antenna may result in further changes in the supported resonant frequencies and anti-resonant frequencies and may result in an additional supported anti-resonant frequency (e.g., a fourth anti-resonant frequency at around 2.15 GHz). The OCFP antenna with the four shorting elements may demonstrate, for example, a high impedance of approximately 200+j150Ω at the fourth anti-resonant frequency of 2.15 GHz. Thus, the OCFP antenna with shorting elements (as illustrated by FIG. 2C) may support resonant frequencies of operation around 1.45 GHz, 1.8 GHz, 2.15 GHz and 2.5 GHz (as illustrated by FIG. 5), and provide high impedances that enable direct impedance matching to rectifiers (e.g., diodes) and/or rectifying circuits (such as the rectifying circuit 170).

The size of the individual holes along with the shorting pins may be adjusted in order to tune the resonant frequencies supported by the OCFP antenna. For example, an increase in the size of a hole and a corresponding shorting pin (e.g., from 0.8 mm up to 1 mm) may cause a corresponding shift in the supported resonant frequencies to higher frequency values (e.g., the resonant frequency of 1.45 GHz may gradually shift to a higher frequency of 1.5 GHz, the resonant frequency of 1.85 GHz may gradually shift to a higher frequency of 1.9 GHz, the resonant frequency of 2.15 GHz may gradually shift to a higher frequency of 2.2 GHz, and/or the resonant frequency of 2.45 GHz may gradually shift to a higher frequency of 2.5 GHz. A decrease in the size of a hole and a corresponding shorting pin (e.g., from 0.8 mm to 0.5 mm) may cause a corresponding shift in the supported resonant frequency (such as 1.45 GHz, 1.85 GHz, 2.15 GHz and/or 2.45 GHz) to lower frequency values (the resonant frequency of 1.45 GHz may gradually shift to a lower frequency of 1.4 GHz, etc.). An OCFP antenna (such as the OCFP antenna 210 of FIG. 2B) with at least a pair of holes, each hole located at approximately the predefined D away from the center of the OCFP antenna, and an absence of shorting elements corresponding to the pair of holes may support three resonant frequencies (such as the resonant frequencies at approximately 1.45 GHz, 1.85 GHz and 2.4 GHz) with an absence of a fourth resonant frequency (such as the resonant frequency at approximately 2.15 GHz). An increase in the size of the pair of holes may cause a corresponding shift in the supported resonant frequency (such as 1.45 GHz, 1.85 GHz, and/or 2.4 GHz) to higher frequency values (such as the resonant frequency at 1.45 GHz may gradually shift to a higher frequency of 1.5 GHz, such as the resonant frequency at 1.85 GHz may gradually shift to a higher frequency of 1.9 GHz, and/or the resonant frequency at 2.45 GHz may gradually shift to a higher frequency of 2.5 GHz). A decrease in the size of the pair of holes may cause a corresponding shift in the supported resonant frequencies (such as 1.45 GHz, 1.85 GHz, and/or 2.4 GHz) to lower frequency values (such as the resonant frequency at 1.45 GHz may gradually shift to a lower frequency of 1.4 GHz, such as the resonant frequency at 1.85 GHz may gradually shift to a lower frequency of 1.8 GHz, and/or the resonant frequency at 2.45 GHz may gradually shift to a lower frequency of 2.35 GHz).

Multiband rectenna systems may be designed using the aforementioned OCFP antenna with shorting elements of FIG. 2C. Adjusting the positioning of the shorting elements in the x-y plane of the OCFP antenna may provide tunability of the OCFP antenna impedance thereby circumventing the use of matching networks and simplifying the design and fabrication of the multiband rectenna systems. In some variations, adjusting the predefined pitch angle, for example, between 20° and 80° and/or adjusting the positioning of the shorting elements in the x-y plane of the OCFP antenna may provide tunability of the operating frequencies and/or impedances of the OCFP antenna based multiband rectenna systems.

Figure 6A:
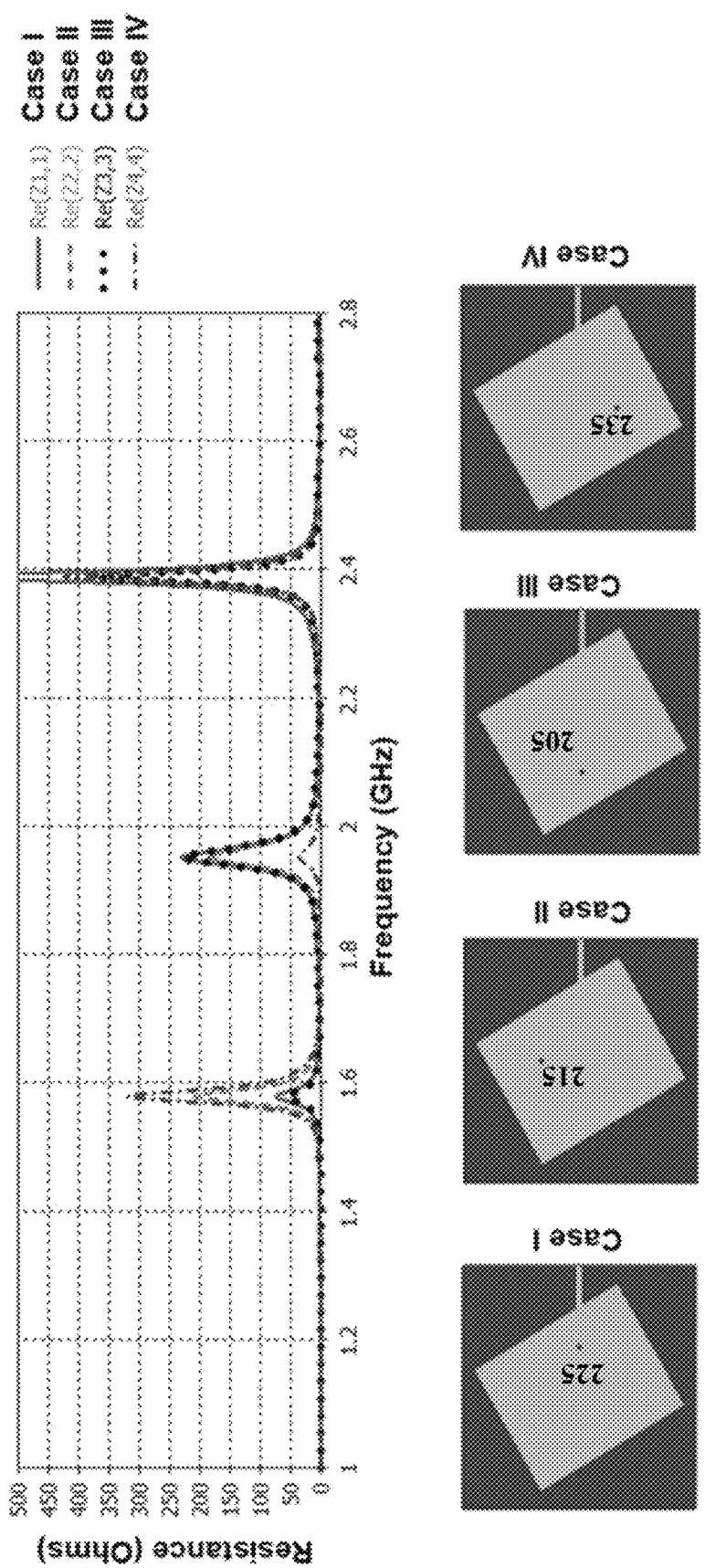
FIGS. 6A-D illustrate variations in a number and positioning of shorting elements of the OCFP antenna and corresponding variations in resistance values of the OCFP antenna versus frequencies.
Figure 6B:
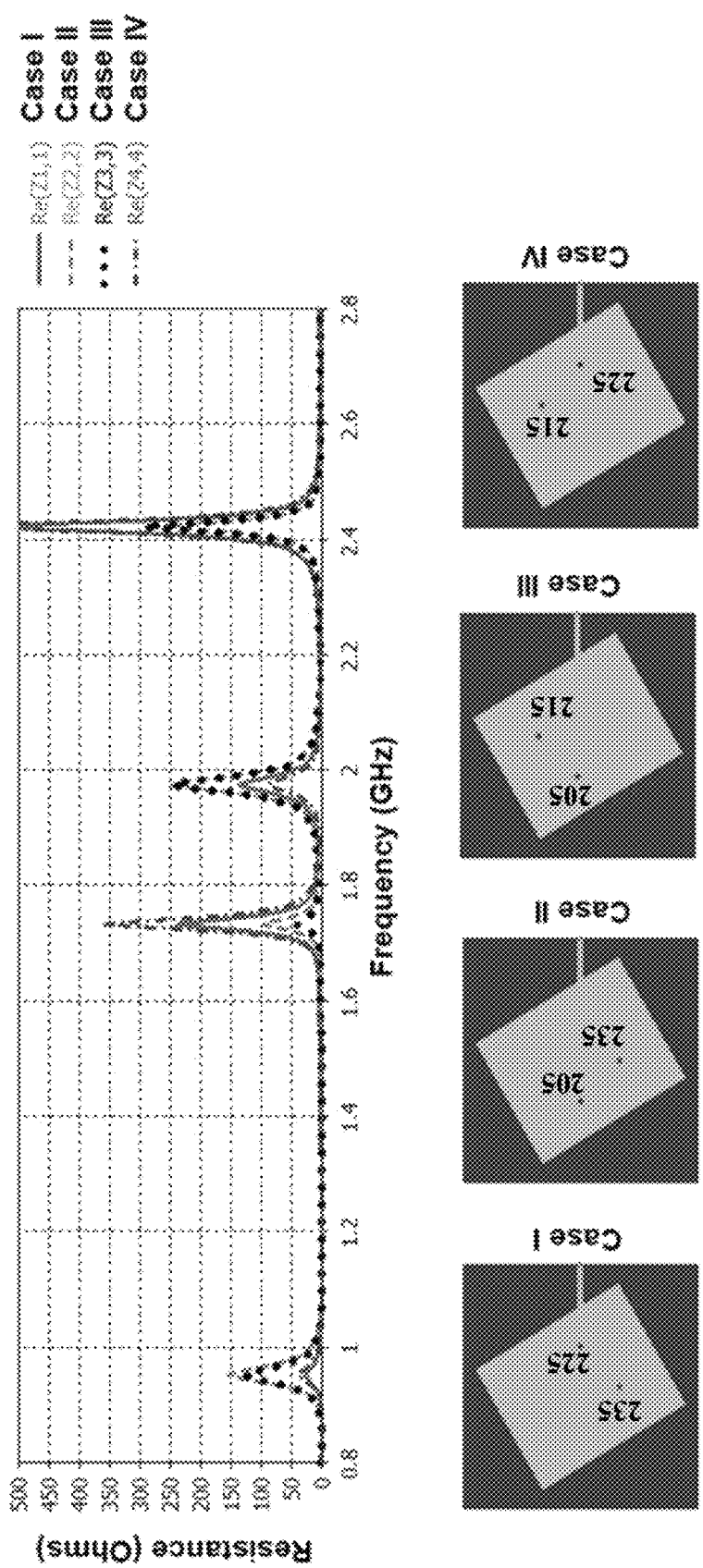
Figure 6C:
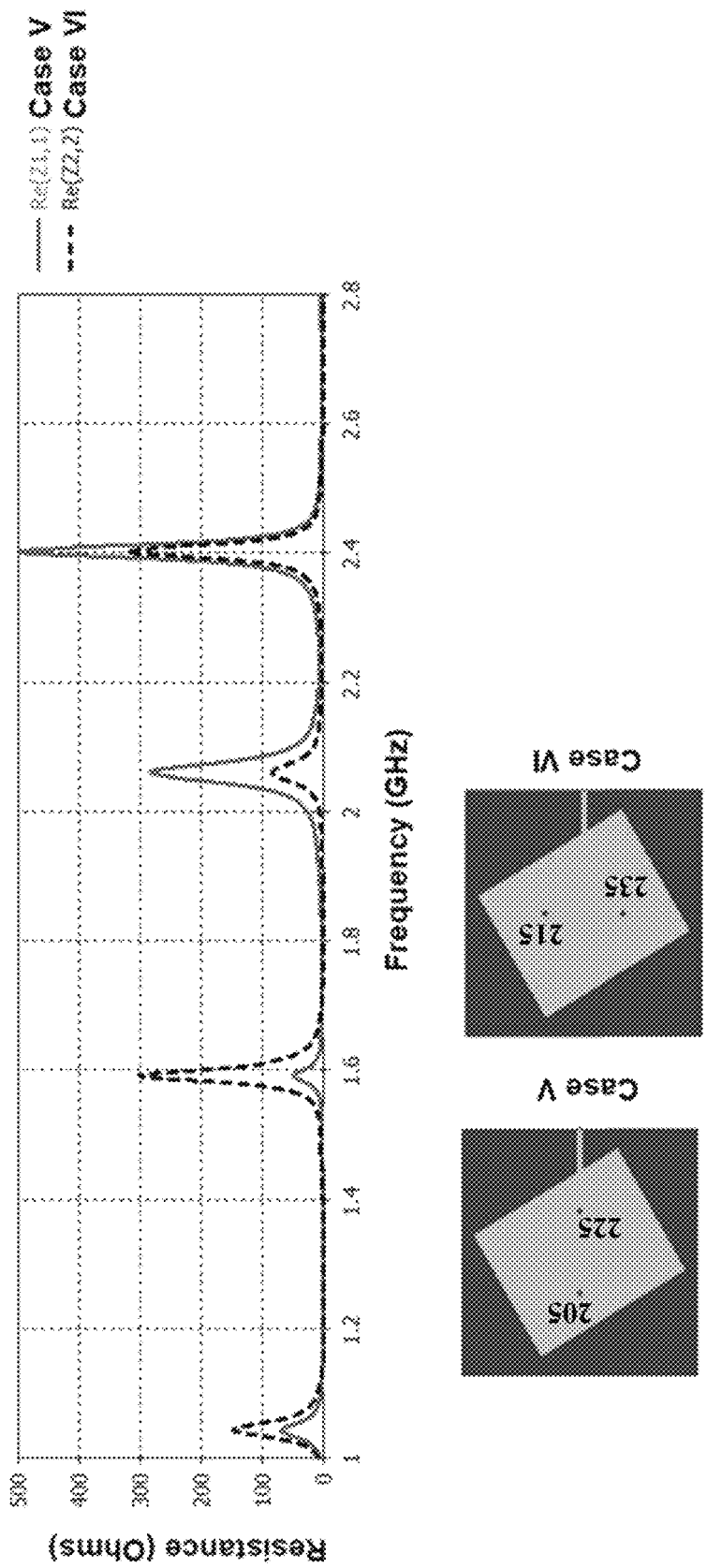
Figure 6D:
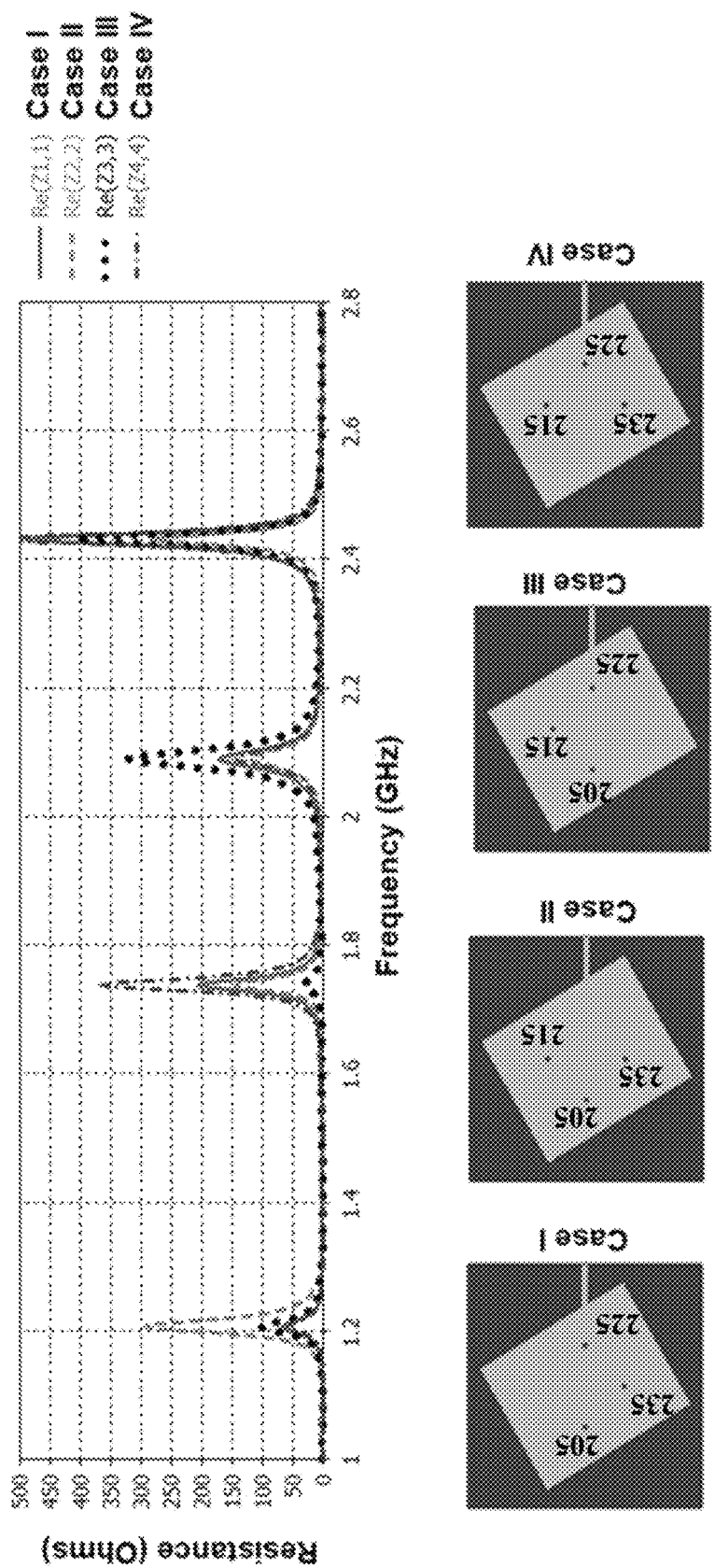

FIGS. 6A-D illustrate variations in the number of shorting elements and positioning of each of the shorting elements of the OCFP antenna and corresponding variations in resistance values of the OCFP antenna versus frequencies. Cases I-IV of FIG. 6A show the OCFP antenna of FIG. 2C with one out of the four shorting elements (e.g., 205 of case III, 215 of case II, etc.) and the corresponding resistance versus frequency plots. The addition of a single shorting element may allow the OCFP antenna to support three resonant frequencies with a fundamental resonant frequency of around 1.55 GHz and two additional resonant frequencies of around 1.95 GHz and 2.4 GHz. FIGS. 6B-C show the OCFP antenna of FIG. 2C with two out of the four shorting elements (e.g., 205 and 215 of case III, 215 and 225 of case IV, 205 and 225 of case V, etc.) and the corresponding resistance versus frequency plots. The addition of two shorting elements shows the appearance of a fourth operating frequency band centered around a range of frequencies of 0.95 GHz to 1.05 GHz. FIG. 6D shows the OCFP antenna of FIG. 2D with three out of the four shorting elements (e.g., 205, 215 and 225 of case III, etc.). The addition of three shorting elements to the OCFP antenna shows four frequency bands of operation with a fundamental resonant frequency of around 1.75 GHz and additional modes supported around frequencies of approximately 1.2 GHz, 2.1 GHz and 2.45 GHz.

Figure 7A:
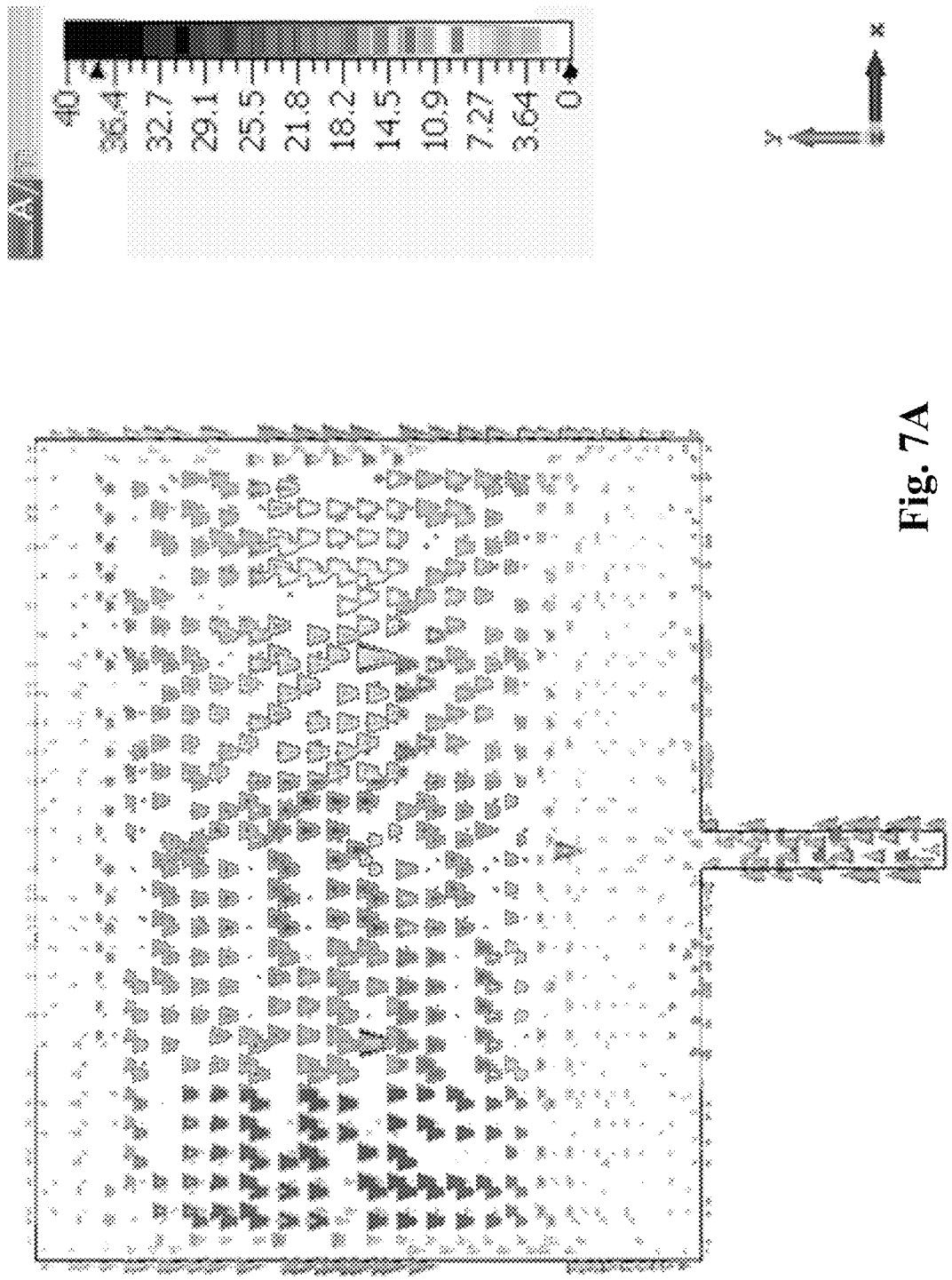
FIG. 7A illustrates a current distribution for the CFP antenna at a resonance frequency and connected to the feed line according to various embodiments.
Figure 7B:
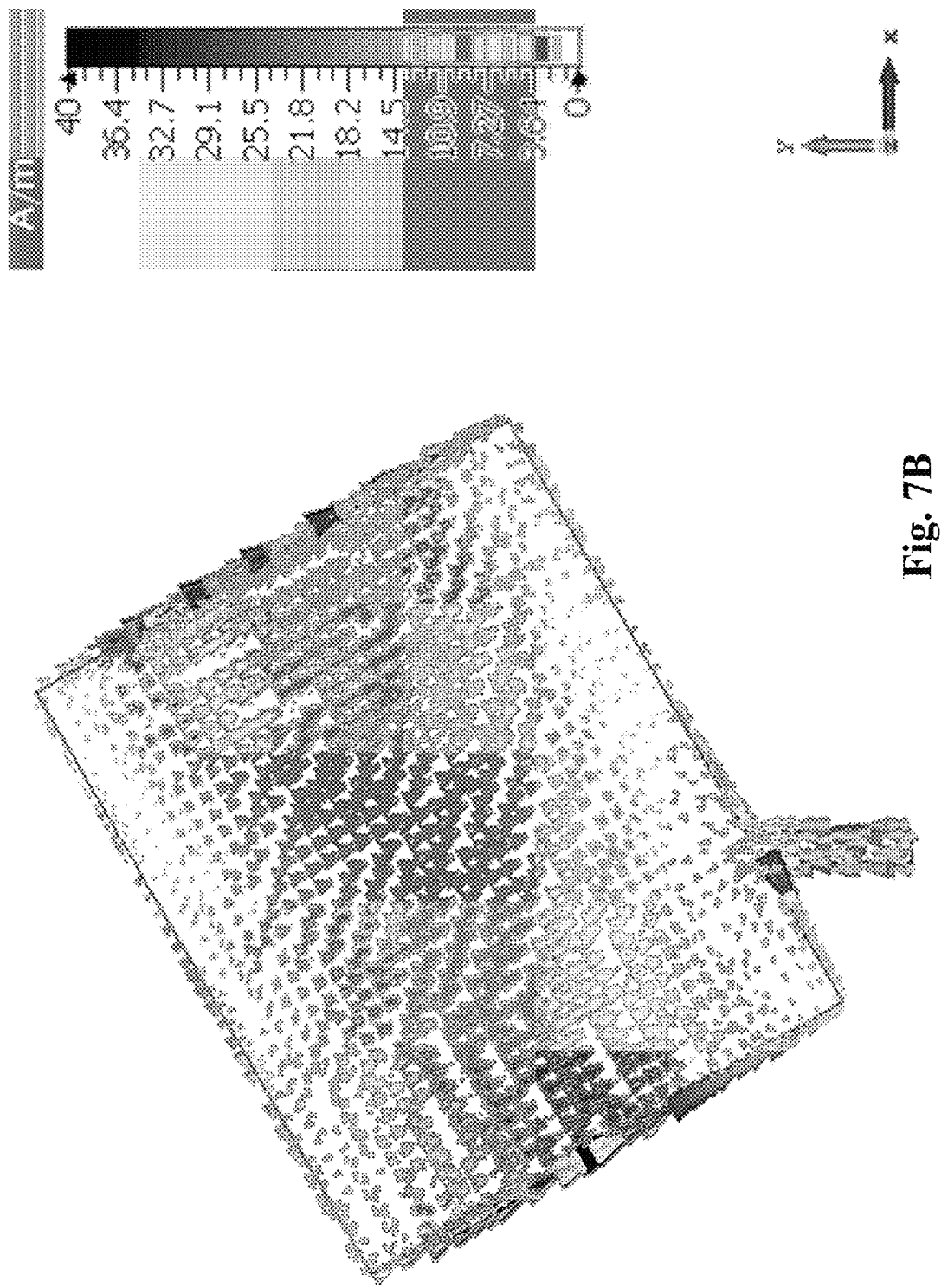
FIG. 7B illustrates a current distribution for the OCFP antenna at a resonance frequency and connected to the feed line according to various embodiments.
Figure 7C:
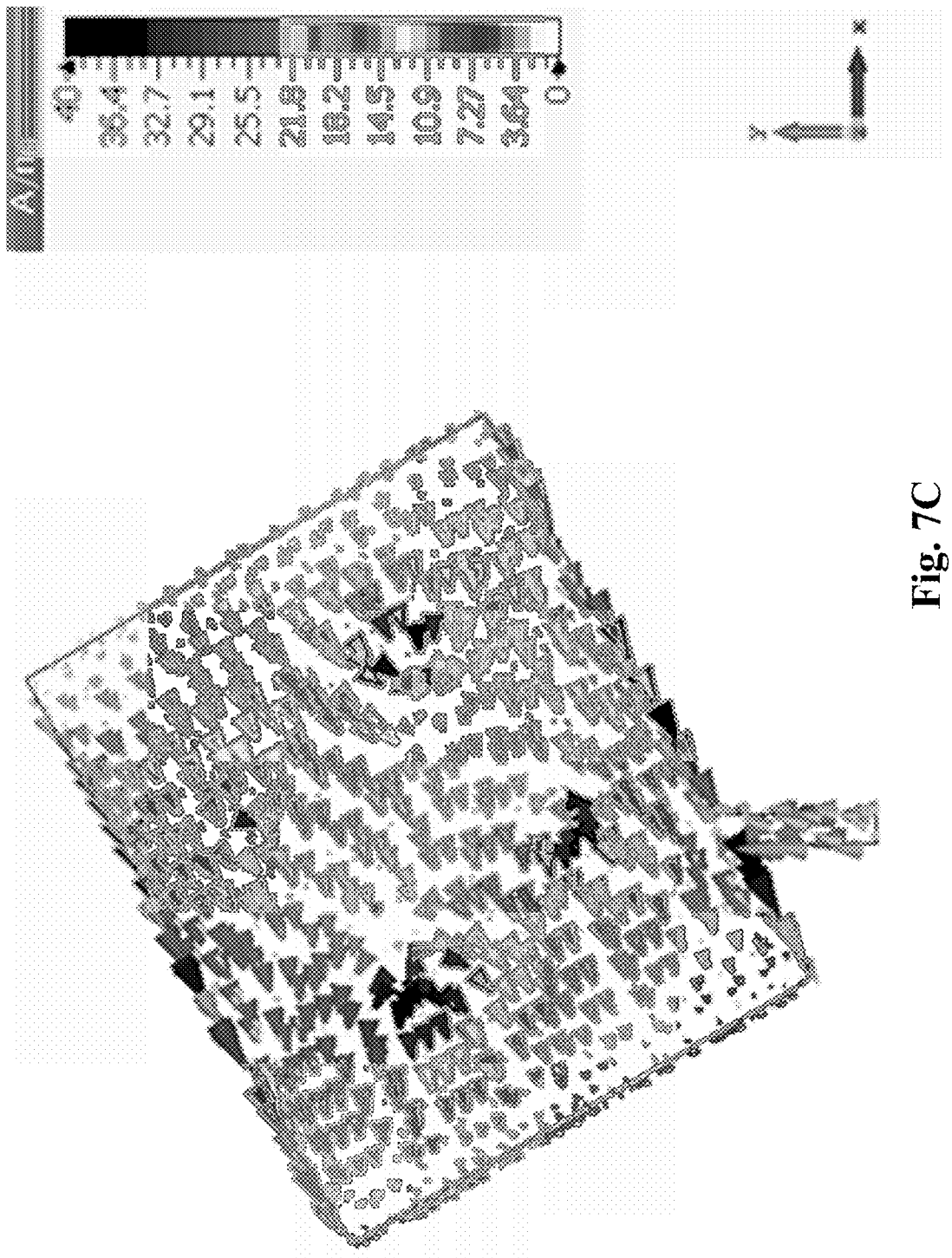
FIG. 7C illustrates a current distribution of the OCFP antenna with four shorting elements at a resonance frequency and connected to the feed line according to various embodiments.

FIGS. 7A-C illustrate simulated surface current distributions at approximately the fundamental resonant frequency of 1.85 GHz that may comprise a $TM_{100}$ mode, for the CFP antenna, the OCFP antenna and the OCFP antenna with shorting elements, respectively. A size and/or an intensity of an arrowhead illustrated in the FIGS. 7A-C may be representative of a current density of a corresponding current flow and a direction of the arrowhead may be representative of a direction of the corresponding current flow. Intensity scale bars in the FIGS. 7A-C may be indicative of current densities in Amperes/m for current distributions shown in the FIGS. 7A-C. FIG. 7A illustrates current paths from a top edge of the CFP antenna to a bottom edge, connected to the feed line, of the CFP antenna at the fundamental resonant frequency of 1.85 GHz and a fundamental $TM_{100}$ mode. FIG. 7B illustrates current paths from a top edge of the OCFP antenna to a bottom edge, connected to the feed line, of the OCFP antenna, at the fundamental resonant frequency of 1.85 GHz and a fundamental $TM_{100}$ mode. Unequal current distributions on two side edges of the OCFP antenna may be due to asymmetrical positioning of the feed line. The OCFP antenna with shorting pins illustrated in FIG. 7C demonstrates stronger current distributions at the fundamental resonant frequency of 1.85 GHz and $TM_{100}$ mode on both side edges than the CFP antenna illustrated in FIG. 7A. The current paths for the OCFP antenna with shorting pins may be directed from a right side edge to a left side edge. In comparison to the current paths for the CFP antenna and the OCFP antenna without shorting pins, the current paths for the OCFP antenna with shorting pins may be approximately perpendicular. Additionally, the OCFP antenna with shorting pins may have a stronger current distribution on the edge that is close to (and/or connected to) the feed line, than current distributions on the other edges. Due to this unbalanced current distribution, multiple resonant frequencies around 1.5 GHz and 2.4 GHz may be supported by the OCFP antenna with shorting pins, in addition to the fundamental resonant frequency at 1.85 GHz, as illustrated in FIG. 5. The fundamental $TM_{100}$ mode is supported at approximately the resonant frequency of 1.85 GHz for the CFP antenna and the OCFP antenna. A $TM_{200}$ mode is supported at approximately the resonant frequency of 2.4 GHz for the CFP antenna and the OCFP antenna. Additional resonant frequencies at around 1.5 GHz and/or 2.15 GHz may be supported via parasitic modes generated by the asymmetrical positioning of the feed line for the OCFP antenna and/or the loading of shorting elements.

Figure 8:
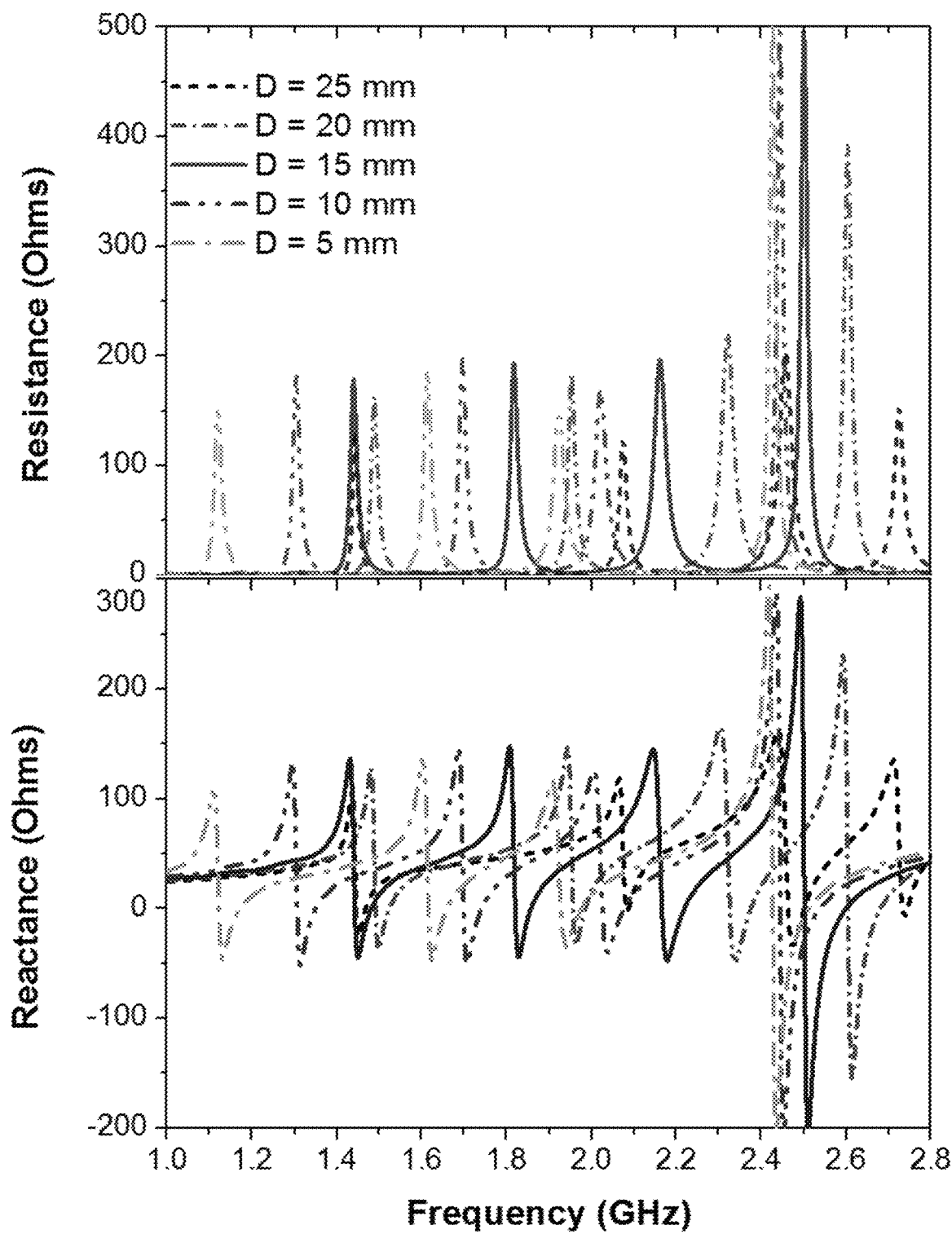
FIG. 8 illustrates variations in resistance and reactance of the OCFP antenna with shorting elements according to various embodiments.

FIG. 8 plots simulated resistance and simulated reactance values for the OCFP antenna with shorting elements (e.g., the OCFP antenna illustrated in FIG. 2C) versus frequencies from 1.0 GHz to 2.8 GHz for different values of predefined distance D. The OCFP rectenna demonstrates high resistance and high reactance values (such as over 100Ω) at the four resonant and the four anti-resonant frequencies that correspond to each value of distance D. By varying the distance D, for example, in intervals of approximately 5 mm, the positioning of the four shorting elements may be tuned in the x-y plane of the OCFP antenna that, in turn, modifies the operating frequency bands, the resonant frequencies, and the anti-resonant frequencies of the OCFP antenna. For example, varying the distance D, (e.g., the predefined distance D may be increased from around 5 mm up to 25 mm while maintaining a constant electrical size of the OCFP antenna) modifies the operating frequency bands (and/or the resonant and anti-resonant frequencies) of the OCFP rectenna between approximately 1.0 GHz and 2.8 GHz. Therefore, the electrical size of the antenna may be tunable from $0.28\lambda_0$ up to $0.78\lambda_0$, by varying the distance D and keeping the physical dimensions of the OCFP antenna constant, wherein $\lambda_0$ corresponds to the fundamental resonant wavelength (e.g., 1.85 GHz for the OCFP antenna of width W=64 mm and length L=56 mm).

Figure 9:
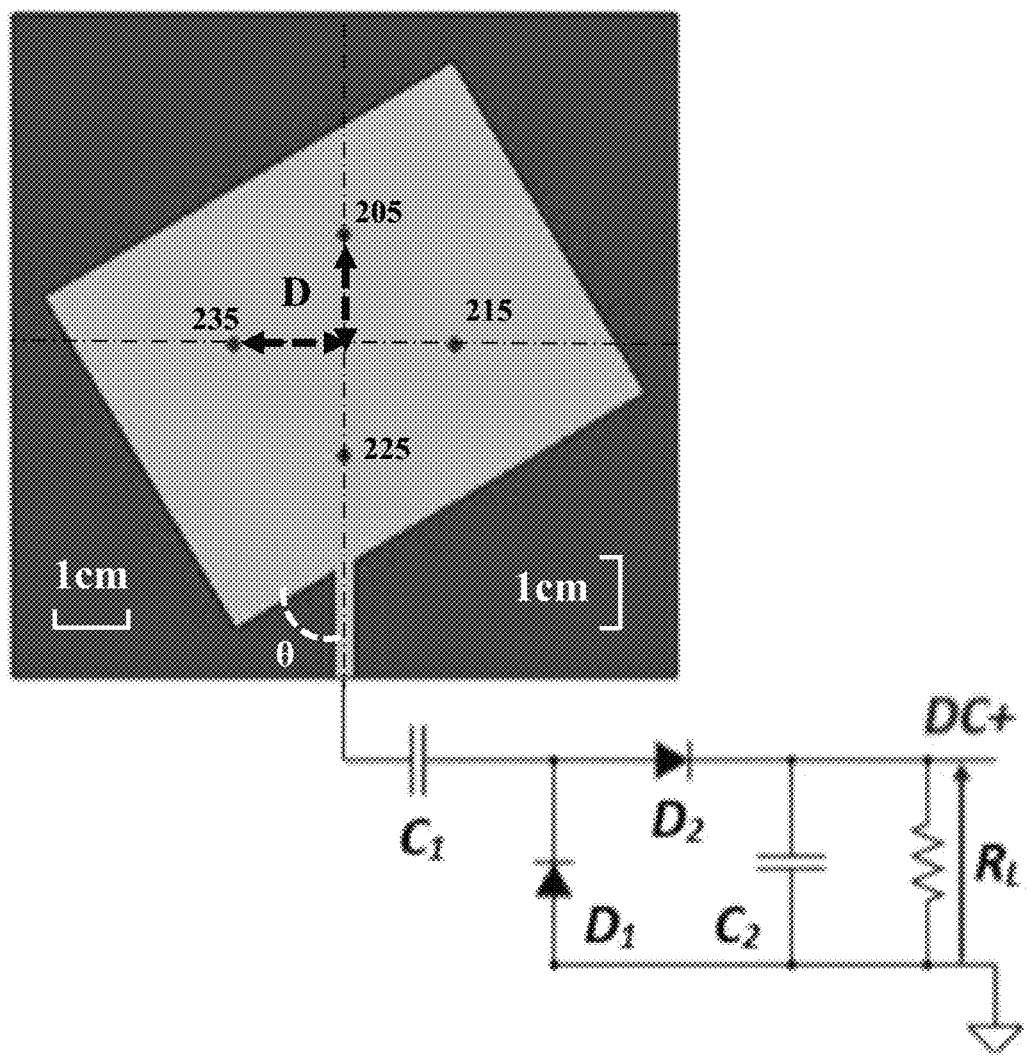
FIG. 9 illustrates the OCFP antenna with four shorting elements connected to a rectifying circuit via the feed line according to various embodiments.

FIG. 9 depicts a schematic view of the OCFP rectenna (as shown in FIG. 1C) comprising the OCFP antenna directly connected to a rectifying circuit (as shown in FIG. 1C). For example, a first end of a feed line of the OCFP antenna may be connected to a first edge of the OCFP antenna at a predefined pitch angle θ. A second end of the feed line of the OCFP antenna may be directly connected (e.g., without any intervening matching network) to the rectifying circuit. The rectifying circuit may comprise a DC block filter capacitor C1 with a first terminal connected to the second end of the feed line. A second terminal of the capacitor C1 may be connected to a cathode (or first terminal) of diode D1 and an anode (or first terminal) of diode D2. An anode (or second terminal) of diode D1 may be connected to a first terminal of capacitor C2 and a first terminal of load $R_L$. A cathode (or second terminal) of diode D2 may be connected to a second terminal of capacitor C2 and a second terminal of load $R_L$. The capacitors may be 100 nF chip capacitors from Murata, the rectifying diodes may be Schottky diodes HSMS2852 from Avago and a 2000Ω resistor may be used as the load (such as the load 175). The rectifying circuit may be configured to convert AC power from the OCFP antenna into DC power delivered to the load $R_L$. In some embodiments, the rectifying circuit may be a half-wave rectifying circuit or a full-wave rectifying circuit.

A voltage doubler rectifying circuit may be selected for enabling a high conversion efficiency and simple topology. Due to the high resistance (such as over 100Ω) and/or high reactance (such as over j100Ω) of the OCFP antenna (as illustrated in FIG. 8) the OCFP antenna may be directly impedance matched to the rectifying circuit (e.g., without any intervening impedance matching circuit components). Therefore, compared with the rectenna systems 100 and/or 130 illustrated by FIGS. 1A-B, with a 50Ω impedance transformation system (such as the matching networks 110, 140a . . . 140n), influence of non-linearities in the rectifying circuit 170 on a reflection coefficient caused by impedance variations of the rectifying circuit 170 are reduced.

Figure 10:
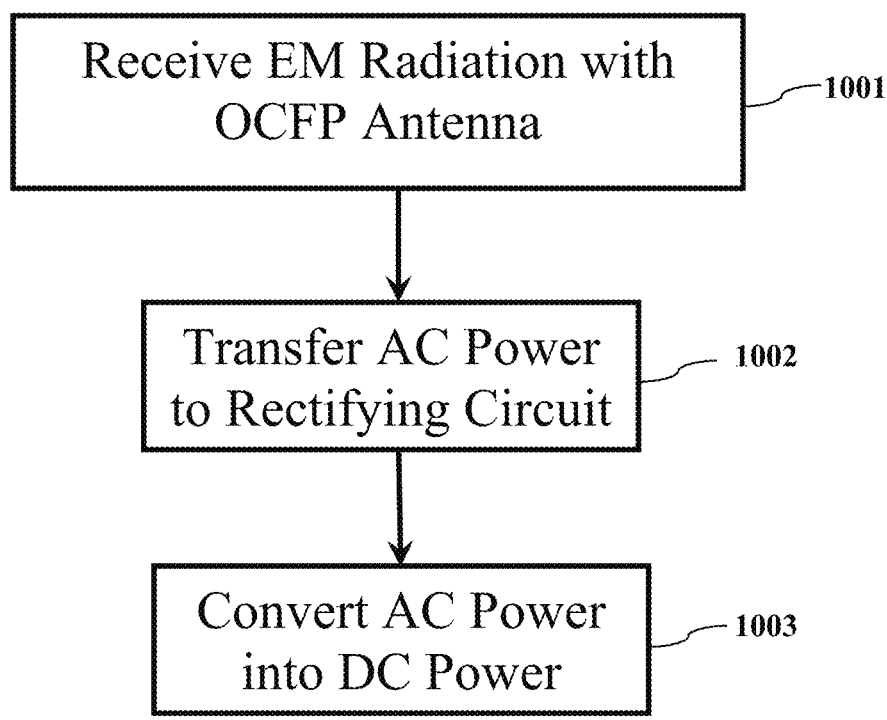
FIG. 10 illustrates a flow chart for a method of operating the OCFP rectenna according to various embodiments.

FIG. 10 illustrates a flow chart for a method of operating the OCFP antenna according to various embodiments. In step 1001, the OCFP antenna may be configured to receive EM radiation, such as RF signals, over a wide range of frequencies (e.g., 1.0 GHz up to 2.8 GHz). In some embodiments, the OCFP antenna may be configured to receive EM radiation over particular frequency bands (e.g., about 1.8 GHz-2.0 GHz, 2.1 GHz-2.17 GHz, etc. for cellular bands, about 2.4 GHz for Wi-Fi signals, etc.). In step 1002, harvested EM radiation (or AC power) from step 1001 may be transferred to a rectifying circuit, such as the rectifying circuit illustrated in FIG. 9. In step 1003, the rectifying circuit may be configured to convert the AC power received from the OCFP antenna into DC power. The rectifying circuit may be configured to transfer to the DC power to a load.

Figure 11:
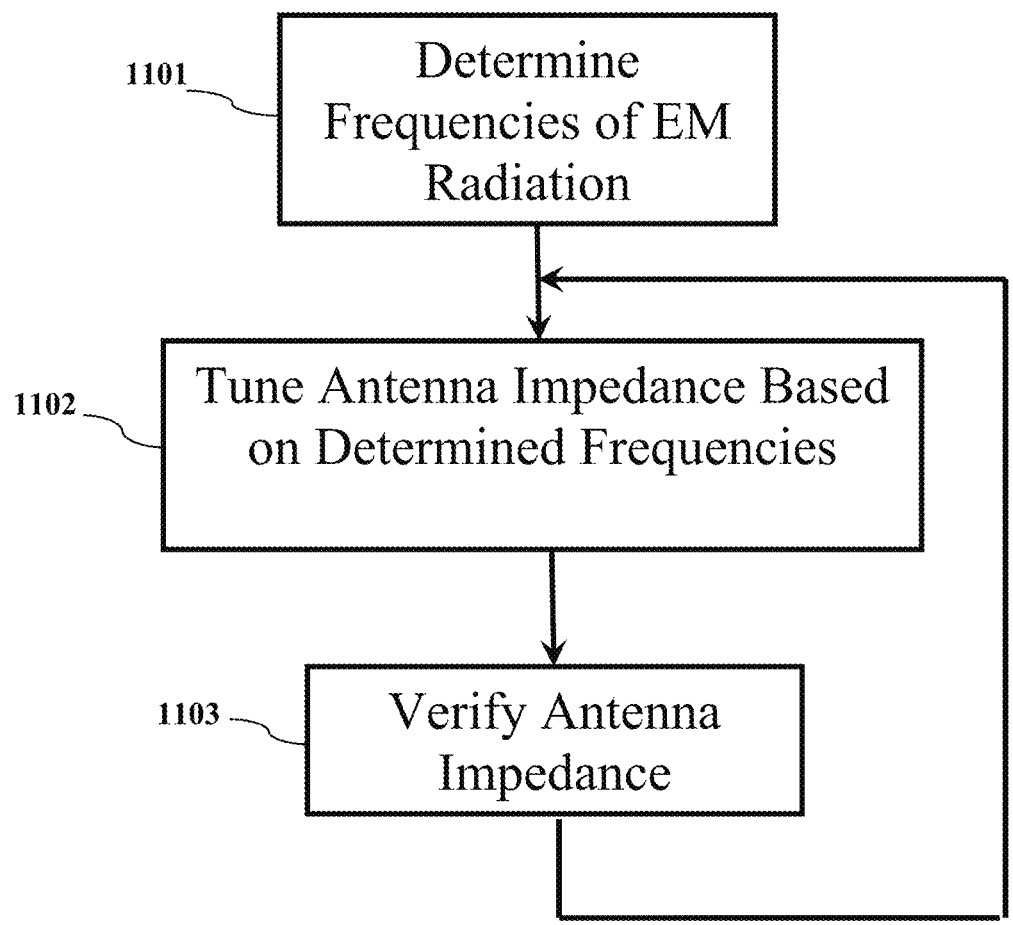
FIG. 11 illustrates a flow chart for a method of tuning an impedance of the OCFP antenna according to various embodiments.

FIG. 11 illustrates a flow chart for a method of tuning an impedance of the OCFP antenna according to various embodiments. In step 1101, a computing device (e.g., a microprocessor, server, etc.) may be configured to determine one or more frequencies of EM radiation at the OCFP antenna. In step 1102, the computing device may be configured to tune an impedance of the OCFP antenna based on the determined one or more frequencies of the EM radiation. The computing device may tune the impedance of the OCFP antenna by varying the distance D between one or more shorting elements (such as the shorting elements illustrated in FIG. 2C) of the OCFP antenna and a center of the OCFP antenna as described earlier with respect to FIG. 8. In step 1103, the computing device may verify the impedance of the OCFP antenna based on analyzing output DC power of a rectifying circuit (such as the rectifying circuit illustrated in FIG. 9) directly connected to the OCFP antenna. In some embodiments, the computing device may verify the impedance of the OCFP antenna based on analyzing RF-DC conversion efficiencies of the rectenna (e.g., a combination of the OCFP antenna and the rectifying circuit.). If the RF-DC conversion efficiencies are too low (e.g., below 40%) for the one or more frequencies, the computing device may further tune the impedance of the OCFP antenna in step 1102.

Figure 12:
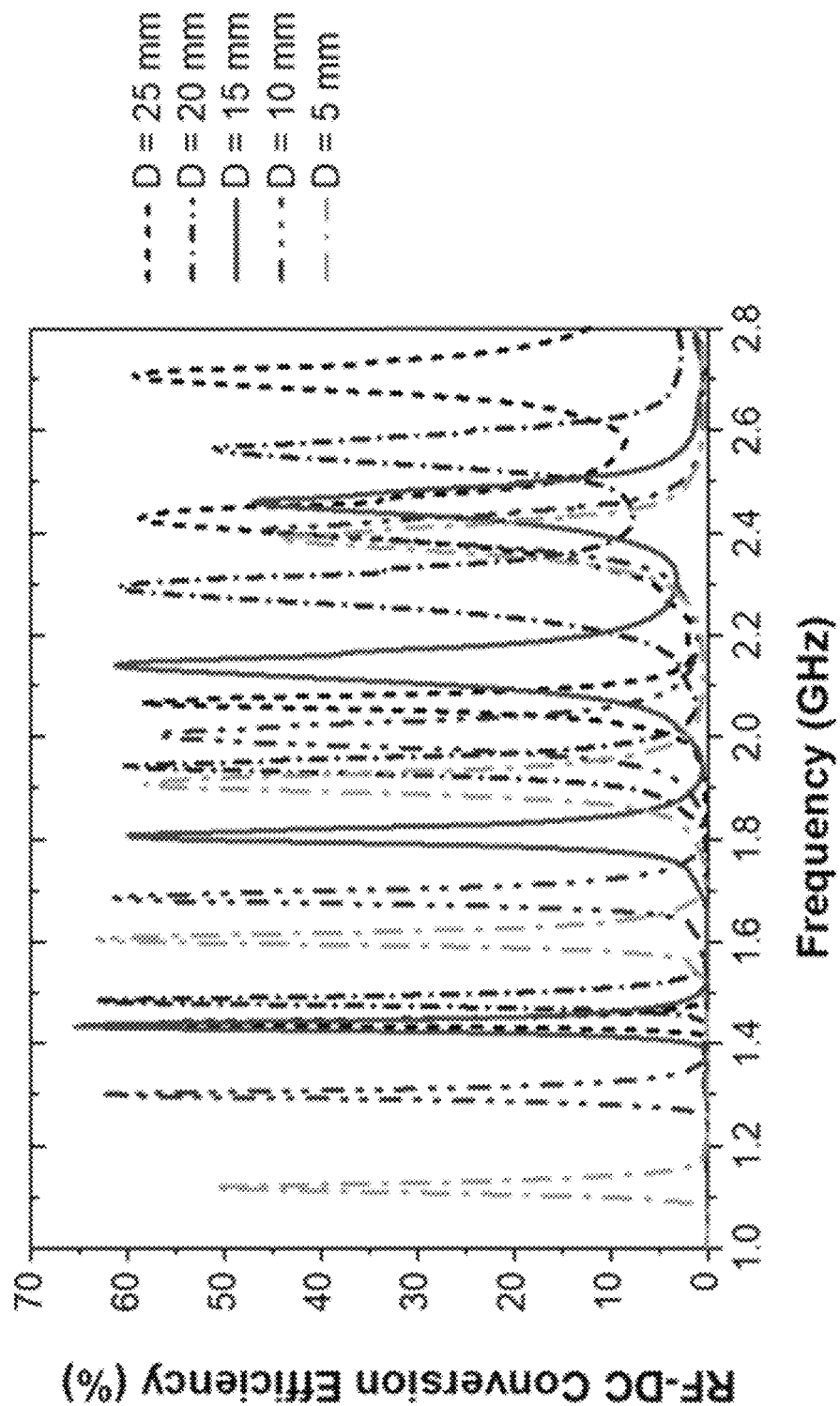
FIG. 12 illustrates variations in RF-to-DC conversion efficiency of the OCFP antenna with shorting elements according to various embodiments.

FIG. 12 plots simulated RF-to-DC conversion efficiencies of the OCFP rectenna for different values of distance D. Various embodiments include evaluating the performance of various configurations (e.g., antenna size, shorting element placement, diode type, etc.) of the OCFP rectenna by co-simulating the configurations using EM simulations (e.g., FDTD) and distributed circuit simulations (e.g., harmonic balance simulation) with the aid of electronic design automation software, such as ADS®, and the EM simulation software, such as the CST Microwave Studio® software. A frequency domain power source may be employed for the rectifying circuit simulation using the electronic design automation software, where a port impedance may be directly linked to the OCFP antenna impedance exported from the EM simulation software. The received power (e.g., EM radiation such as RF signals) by the OCFP antenna may be approximately 0 dBm for the simulations. The RF-to-DC conversion efficiency, $\eta_{RF-DC'}$ may be calculated using equation 1 where, $P_{OUT}$ is the output DC power from the rectenna and $P_{IN}$ is the received RF power by the antenna.

$$\eta_{RF-DC} = \frac{P_{OUT}}{P_{IN}} \quad \text{[Equation 1]}$$

For an input power of approximately 1 mW (0 dBm), the rectenna provides high conversion efficiency of about 60% at four different operating frequency bands. The operating frequency bands of the OCFP rectenna are tunable from 1.1 GHz to 2.75 GHz for different positions of the shorting elements in the x-y plane and varying values of the predefined distance D. In some variations, varying the predefined distance D varies a center frequency corresponding to each of the four operating frequency bands. Thus, the OCFP rectenna provides tunable operating frequencies over a wide range of frequencies with high conversion efficiencies. The elimination of a matching network in the OCFP rectenna system reduces complexities, costs, fabrication errors, and operating power losses.

Figure 13:
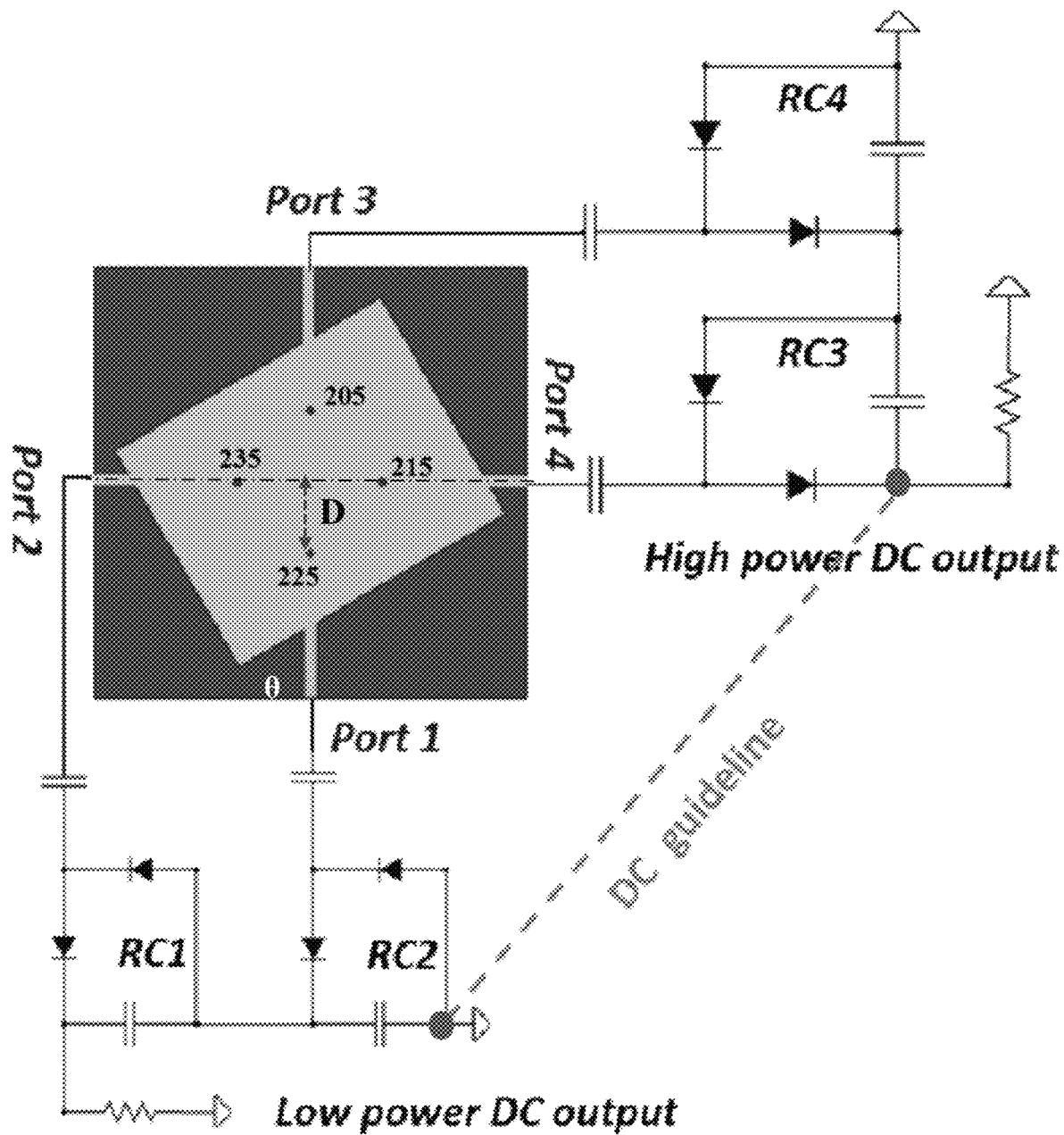
FIG. 13 illustrates the OCFP antenna, with four shorting elements, connected to four rectifying circuits via four corresponding feed lines according to various embodiments.

FIG. 13 illustrates the OCFP antenna (such as the OCFP antenna illustrated in FIG. 9) with three additional feed lines that respectively connect one-to-one to rectifying circuits via ports 2, 3, or 4. Each of the feed lines may be respectively positioned along an edge of the OCFP antenna at a predefined pitch angle θ (e.g., between 30° and 70°). Each of the feed lines may individually align with the center of the OCFP antenna. Each of the rectifying circuits may be optimized for different (e.g., lower or higher) power applications. For example, the OCFP antenna with four feed lines and four corresponding ports may be configured for adaptive input power rectification with ports 1 and 2 configured for low DC power output while ports 3 and 4 may be configured for high DC power output. In alternative arrangements, the ports 3 and/or 4 may be configured for low DC power output, while the ports 1 and/or 2 may be configured for high DC power output. Each of the four ports may be connected individually to a rectifying circuit for harnessing AC power at four different power levels. Each of the four ports may align with a corresponding shorting element. For example, port 1 may align with shorting element 225, port 2 may align with shorting element 235, port 3 may align with shorting element 205 and port 4 may align with shorting element 215. In some variations, each of the four ports may align with a corresponding pair of shorting elements as illustrated in FIG. 13. For example, ports 1 and 3 may align with a first pair of shorting elements 205 and 225, and ports 2 and 4 may align with a second pair of shorting elements 215 and 235. Each of the four ports may align with the center of the OCFP antenna and a pair of shorting elements. For example, ports 1 and 3 may align with the first pair of shorting elements 205 and 225, and with the center of the OCFP antenna. In some embodiments, each of the four ports may align with the center of the OCFP antenna and one of the shorting elements.

Two rectifying circuits, RC1 and RC2, may be connected to ports 1 and 2 respectively, and a combined output DC power from the ports 1 and 2 may provide rectification of incoming RF waves with random polarizations. Two additional rectifying circuits RC3 and RC4 may be connected to ports 3 and 4 to allow for rectification of one or more polarizations (e.g., cross-polarization, co-polarization, linear polarization, etc.) of input RF energy. A DC guideline (e.g., a copper wire, microstripline, etc.) may be electrically connected between the low power and high power rectifying circuits as illustrated in FIG. 13 for transfer of power between the rectifying circuits (e.g., from RC2 to RC3). Rectifying diodes for the low power rectification circuits, RC1 and RC2, may be of one type, e.g., HSMS2852 (Avago Technologies) with a forward bias voltage of 0.35 V and a breakdown voltage of 3.8 V, while the rectifying diodes for the high power rectification circuits, RC3 and RC4, may be of another type, e.g., HSMS2862 (Avago Technologies) with a forward bias voltage of 0.65 V and a breakdown voltage of 7 V. The diodes for the low power rectifying circuit e.g., the HSMS2852 diodes, may be selected to have a lower power consumption than the diodes for the high power rectifying circuits, e.g., the HSMS2862 diodes, that may be selected to have a higher power consumption. The rectifying circuits using the HSMS2852 diodes may reach saturation (e.g., maximum output voltage) at lower input power levels (e.g., 5 dBm) than the rectifying circuits using the HSMS2862 diodes due to the lower breakdown voltage of the HSMS2852 diodes. In contrast, the rectifying circuits using the HSMS2862 diodes may break down at higher input power levels (e.g., 15 dBm) and have higher power consumption due to the higher forward bias and reverse breakdown voltages of the HSMS2862 diodes. The high impedance of the OCFP antenna (e.g., over 50Ω and up to 500Ω) may allow for low and high power rectifying circuits to be directly connected to the antenna without the need for an impedance matching network as discussed earlier with respect to FIGS. 1 and 8.9

Figure 14A:
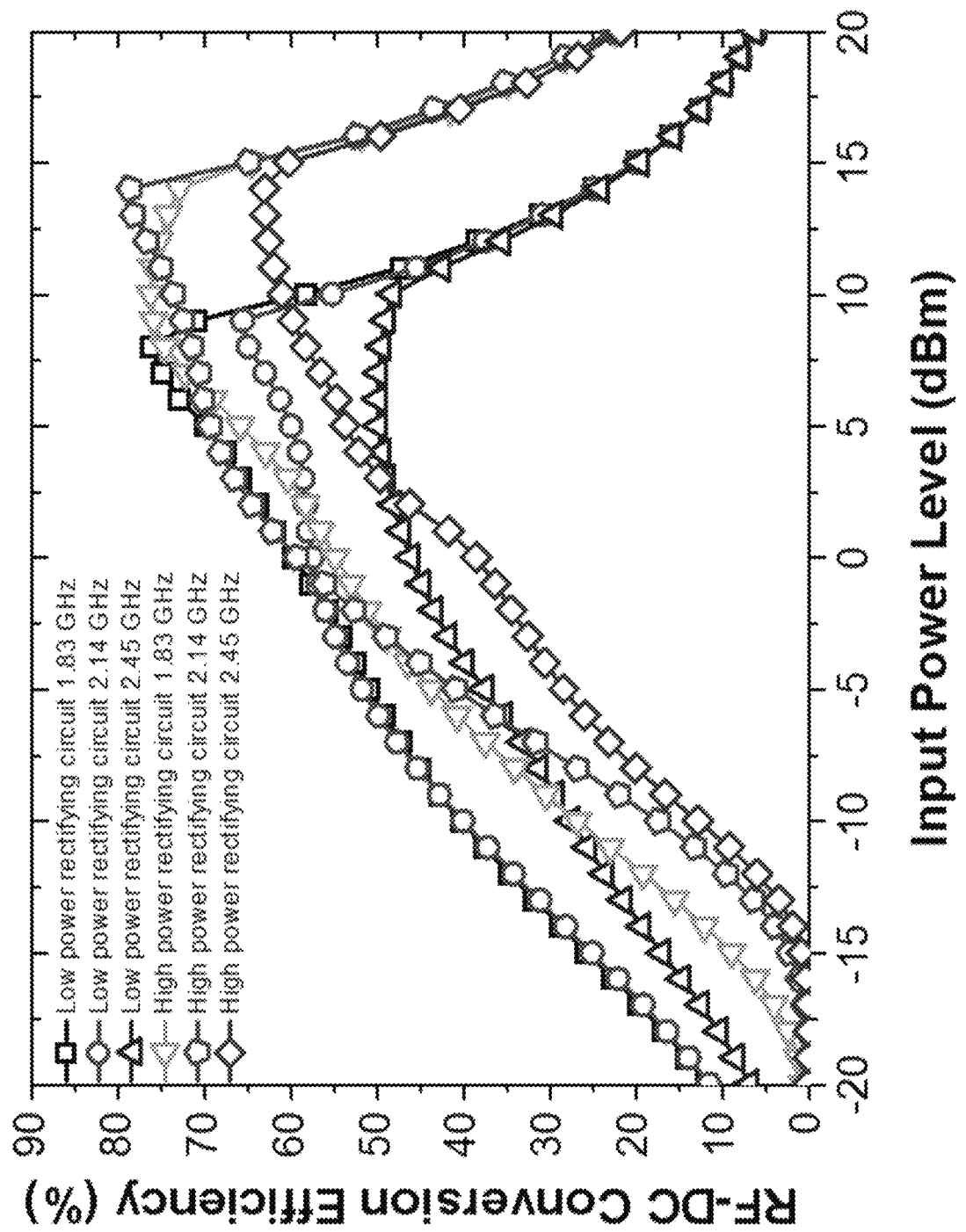
FIG. 14A illustrates plots of the RF-to-DC conversion efficiency according to various embodiments.

FIG. 14A illustrates simulated RF-to-DC conversion efficiencies for the OCFP antenna at three different frequency bands as a function of input power level. The RF-to-DC conversion efficiencies as a function of input power level are simulated using the low power DC output circuit and the high power DC output circuit (e.g., of FIG. 13) separately for a load of approximately 2000Ω and operating frequencies of 1.83 GHz, 2.14 GHz and 2.45 GHz. The figure illustrates that RF-to-DC conversion efficiencies greater than 40% for input power levels varying between 0 to 10 dBm for the low and high power DC output circuits are achieved. The conversion efficiency of the low power DC output may be around 10% higher than that of the high power DC output for input power levels varying between −20 dBm and 0 dBm. However, the low power rectifying circuits (e.g., RC1 and RC2) break down (e.g., as indicated in a sharp decline in efficiency) at input power levels of approximately 8 dBm, while the high power rectifying circuits break down at higher input power levels of approximately 15 dBm. The low power rectifying circuits demonstrate maximum conversion efficiencies of around 50%-70% and the high power rectifying circuits demonstrate maximum conversion efficiencies of around 75%.

Figure 14B:
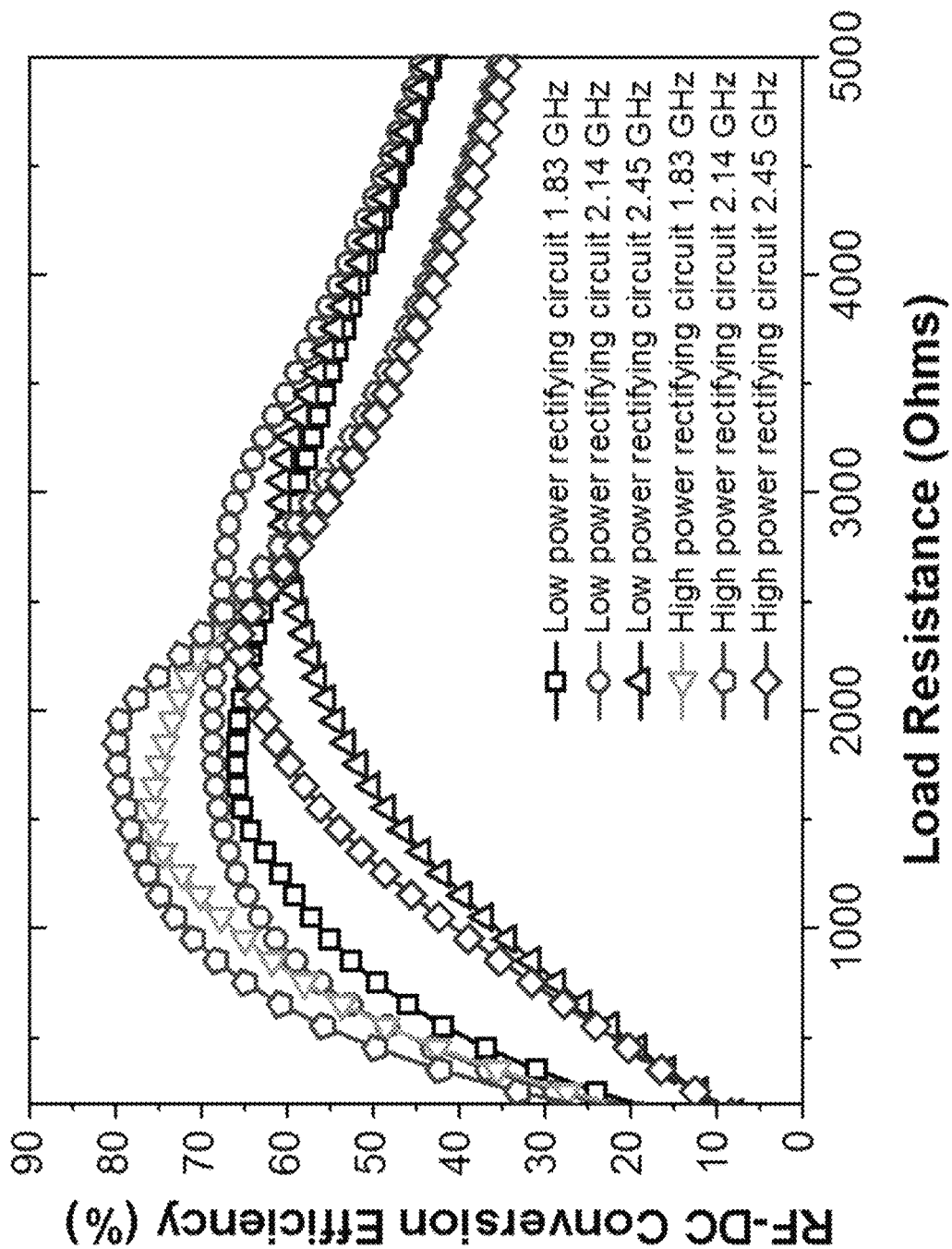
FIG. 14B illustrates plots of the RF-to-DC conversion efficiency according to various embodiments.

FIG. 14B illustrates simulated RF-to-DC conversion efficiencies for the OCFP rectenna at three different frequency bands as a function of load resistance. The OCFP rectenna demonstrates RF-to-DC conversion efficiencies of above 40% for low input power levels of around 7 dBm and high input power levels of around 14 dBm at the three operating frequencies of around 1.83 GHz, 2.14 GHz and 2.45 GHz, and for varying load resistances of 1000Ω up to 5000Ω. Thus, the conversion efficiency of the OCFP rectennas at the three different operating frequencies is nearly consistent over a wide range of load impedances (e.g., 1000Ω up to 5000Ω). The OCFP rectenna demonstrates a conversion efficiency >40% as a figure of merit for a wide input power range between 0 to 15 dBm, and for a wide load impedance range from 800Ω to 4000Ω. The nonlinear effects of the rectifying circuit (e.g., impedance mismatch and efficiency reduction due to the rectifying diode impedance variations versus frequency, input power and load impedance) may therefore be significantly reduced which is of high significance for wireless power transfer and wireless energy harvesting based applications. Moreover, the adaptive OCFP rectenna with variable input impedances enables WPT and WEH over a wide range of operating frequencies from 1.1 GHz to 2.7 GHz, as illustrated in FIG. 11.

Figure 15:
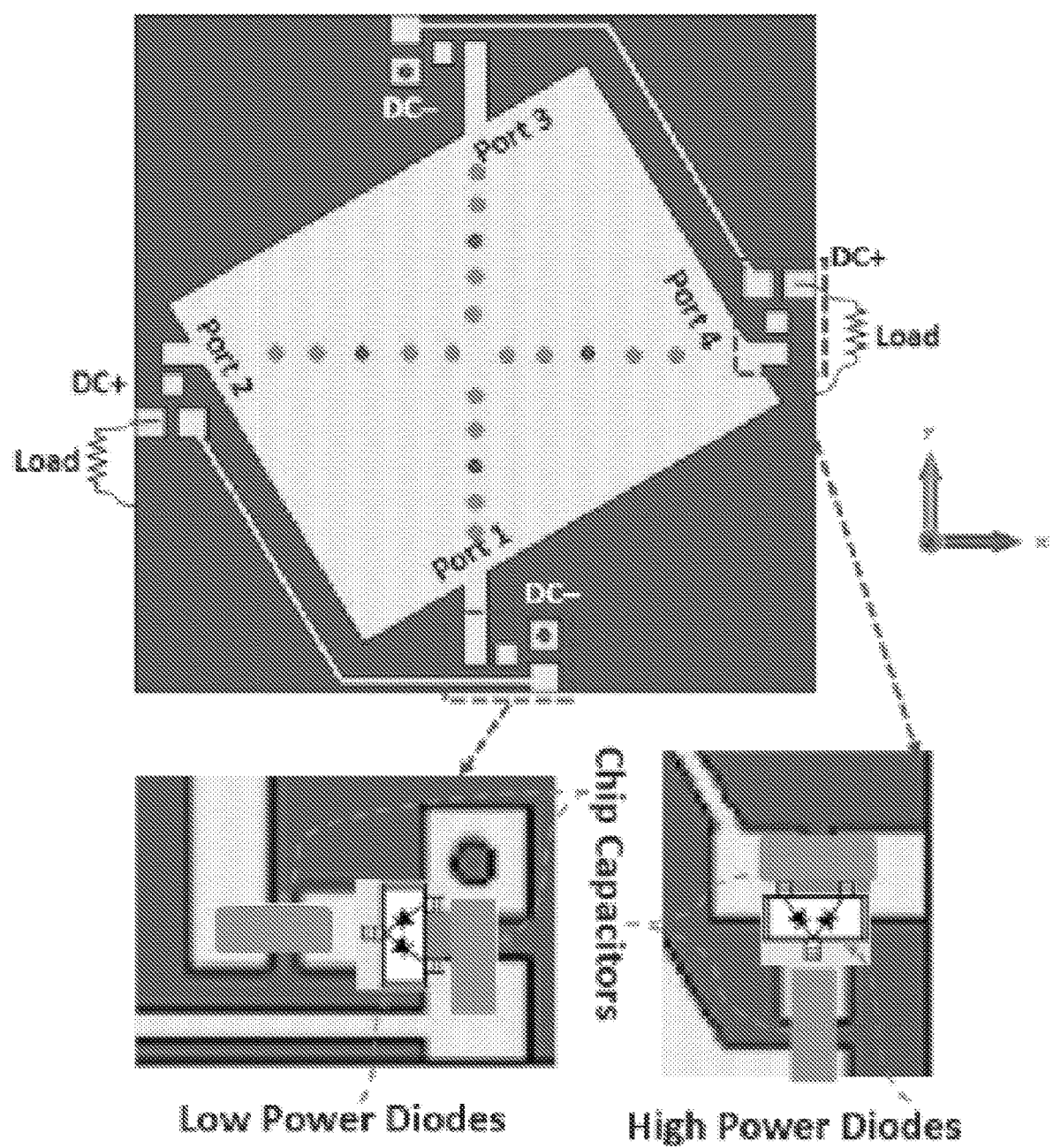
FIG. 15 illustrates an OCFP rectenna schematic according to various embodiments.

FIG. 15 illustrates a layout of the OCFP rectenna (such as the OCFP rectenna illustrated in FIG. 1C and/or FIG. 9). An overall size of the PCB may be, for example, around 90×90×1.58 mm³. The aforementioned OCFP rectenna is of a simple structure with low power diodes, high power diodes and capacitors forming the rectifying circuit that provides DC power output to the load. No circuit elements for a matching network are needed. The OCFP rectenna may be configured for operation at frequencies of approximately 1.4 GHz, 1.8 GHz, 2.1 GHz and 2.45 GHz with the four shorting elements positioned approximately a predefined distance D=15 mm away from the center of the OCFP antenna. The OCFP rectenna demonstrates variable input impedances by varying the positioning of each of the four shorting elements along a series of holes that are each separated by a distance, e.g., approximately 5 mm, while maintaining a symmetric positioning of the four shorting elements at a same predefined distance D away from the center of the OCFP antenna. Variations up to around 30% in the positioning of the four shorting elements during fabrication, as illustrated by FIG. 15, may not influence the operating parameters of the OCFP rectenna significantly. The operating frequency bands and the input impedances of the OCFP antenna may be manually tuned by changing the predefined distance D between the shorting elements and the center of the OCFP antenna. For example, the shorting elements may be added to the OCFP antenna by soldering the holes. The holes may be approximately 0.8 mm in diameter. According to some embodiments, the input impedance of the OCFP rectenna may be tuned in ways that do not rely on the addition of shorting elements such as pins, solder, and/or vias. For example, switches that are configured to form an electrical short at varying predefined distances D from the center of the OCFP antenna may be designed. The switches may be manually selectable. For example, the switches may be configured to present to a user, a selection of five different distance settings (such as distance D=5 mm, 10 mm, 15 mm, 20 mm or 25 mm) between each short and the center of the OCFP antenna.

Figure 16:
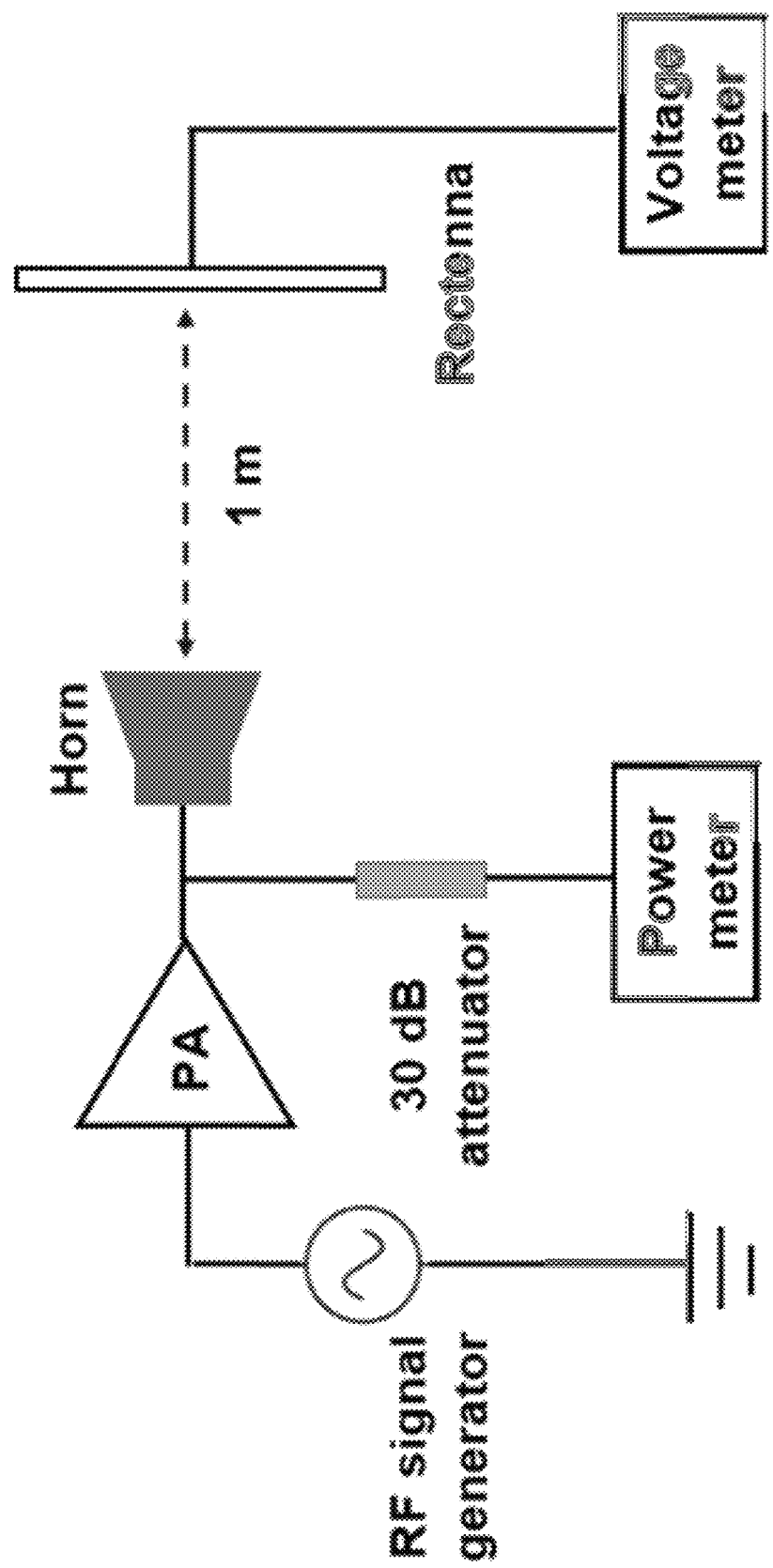
FIG. 16 illustrates a measurement setup for a rectenna according to various embodiments.

FIG. 16 illustrates a measurement setup for the OCFP rectenna. The measurement setup may comprise an RF signal generator connected to a power amplifier with a gain of 30 dB, for example, that amplifies RF signals generated by the RF signal generator. A calibrated horn antenna (e.g., R&SHF906) may be used for transmitting the amplified RF signals outputted by the power amplifier. The OCFP rectenna may receive the transmitted RF signals at a distance, e.g., of approximately 1 m away, from the transmitting horn antenna. The transmitting power of the horn may be measured by a power meter while the received power, for example, from EM radiation, by the OCFP rectenna may be calculated using equation 2, known as the Friis transmission equation, where $P_r$ is the received power in dBm, $P_t$ is the transmitting power of the horn in dBm, $G_t$ is the realized gain of the horn in dB, $G_r$ is the realized gain of the proposed rectenna in dB, $\lambda$ is the wavelength of interest, and r is the distance (r=1 m).

$$P_r = P_t + G_t + G_r + 20\log_{10}\frac{\lambda}{4\pi r} \quad \text{[Equation 2]}$$

Since the OCFP antenna has been integrated with the rectifying circuit, a realized gain of the OCFP rectenna cannot be measured with a typical 50Ω port. The realized gain may be calculated using the directivity of the OCFP antenna multiplied by the impedance matching efficiency obtained from the simulation using the electronic design automation software and/or the EM simulation software.

Figure 17:
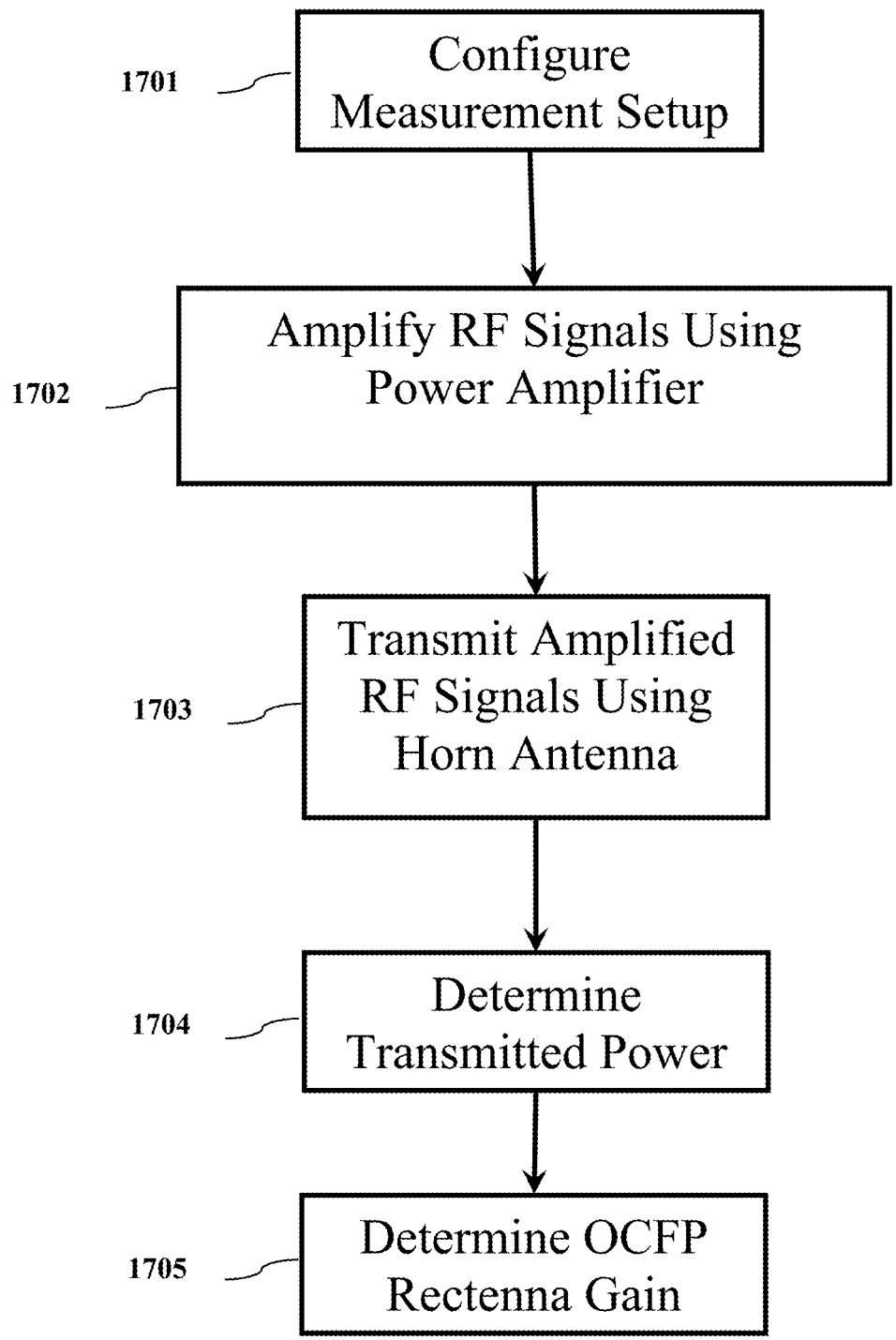
FIG. 17 illustrates a flow diagram for a method of measuring a gain of the OCFP rectenna.

FIG. 17 illustrates a flow diagram for a method of measuring the gain of the OCFP rectenna. Step 1701 comprises configuring the measurement setup illustrated in FIG. 15. The measurement setup may be configured by connecting an RF signal generator to a power amplifier with, for example, a gain of 30 dB. In step 1702, the power amplifier may amplify the RF signals generated by the RF signal generator. In step 1703, a horn antenna may transmit the amplified RF signals. In step 1704, a transmitted power of the horn antenna may be measured by a power meter. In step 1705, a gain for the OCFP rectenna may be determined based on the received power by the OCFP rectenna from the horn antenna. The received power may be calculated using the Friis equation 2 described with respect to FIG. 16. The OCFP rectenna may receive the transmitted RF signals at a distance, e.g., of approximately 1 m away, from the transmitting horn antenna. The realized gain $G_r$ of the OCFP rectenna may be determined based on a maximum gain of the OCFP antenna multiplied by an impedance matching efficiency between the OCFP antenna and the rectifier.

Figure 18A:
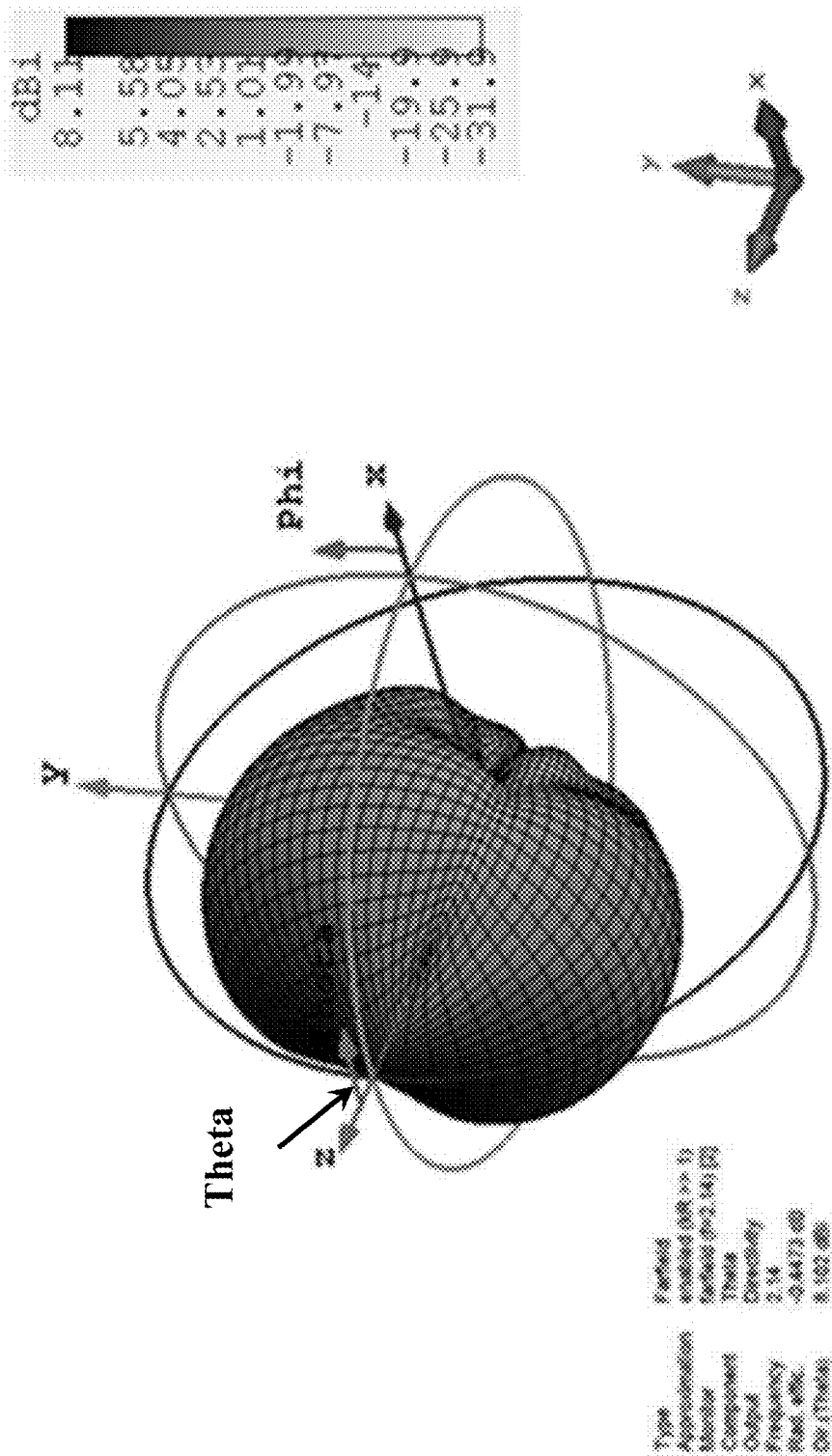
FIGS. 18A-18B illustrate 3D gain patterns of the OCFP rectenna according to various embodiments.
Figure 18B:
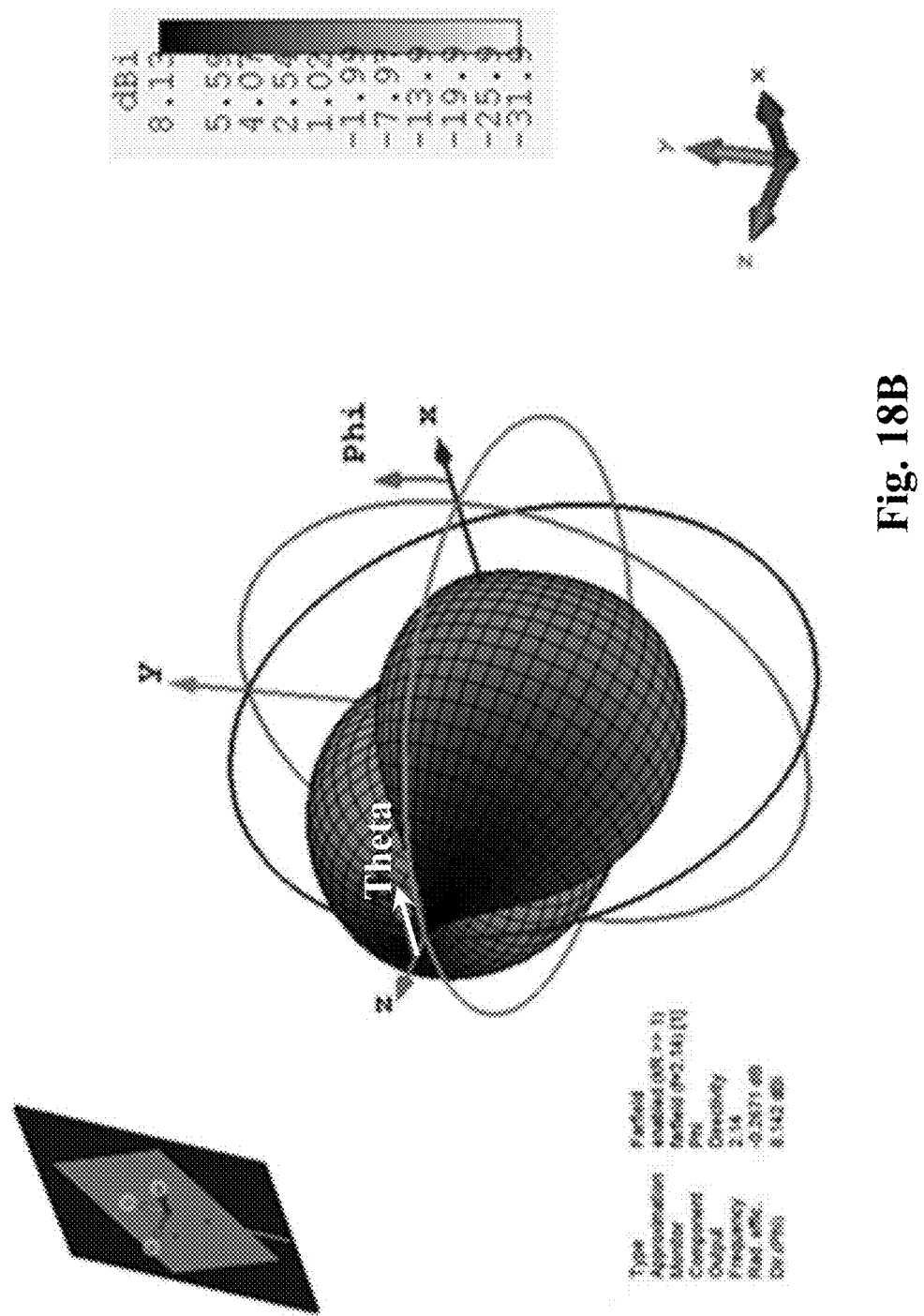

FIGS. 18A-B illustrate simulated 3D gain patterns of the OCFP rectenna for cross-polarized and co-polarized RF inputs, respectively. Maximum realized gains for cross-polarized and co-polarized RF inputs are about 8 dBi for the OCFP rectenna. x and y axes for FIGS. 17A-B are representative of step sizes of around 5° for phi and theta.

Figure 19A:
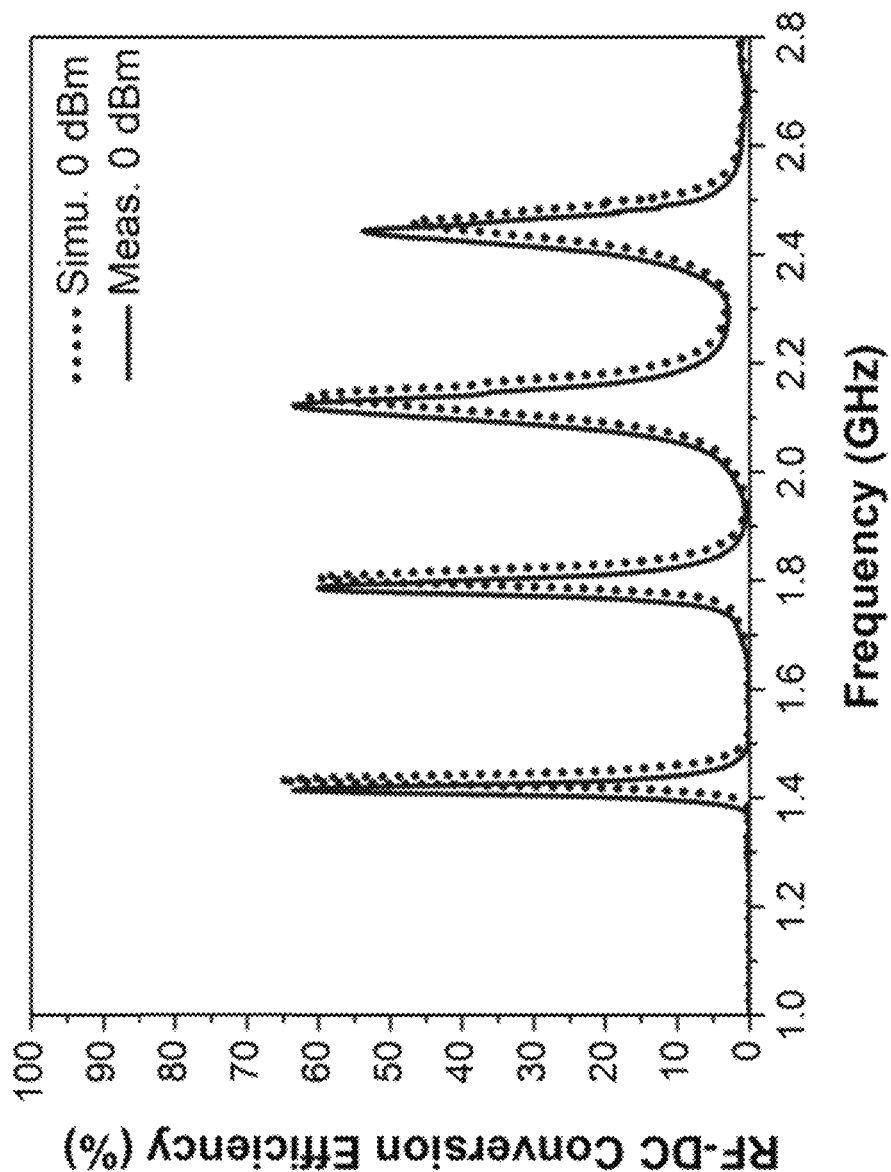
FIGS. 19A-C illustrate simulated and measured conversion efficiencies for the OCFP rectenna for different frequencies and for three different input power levels according to various embodiments.
Figure 19B:
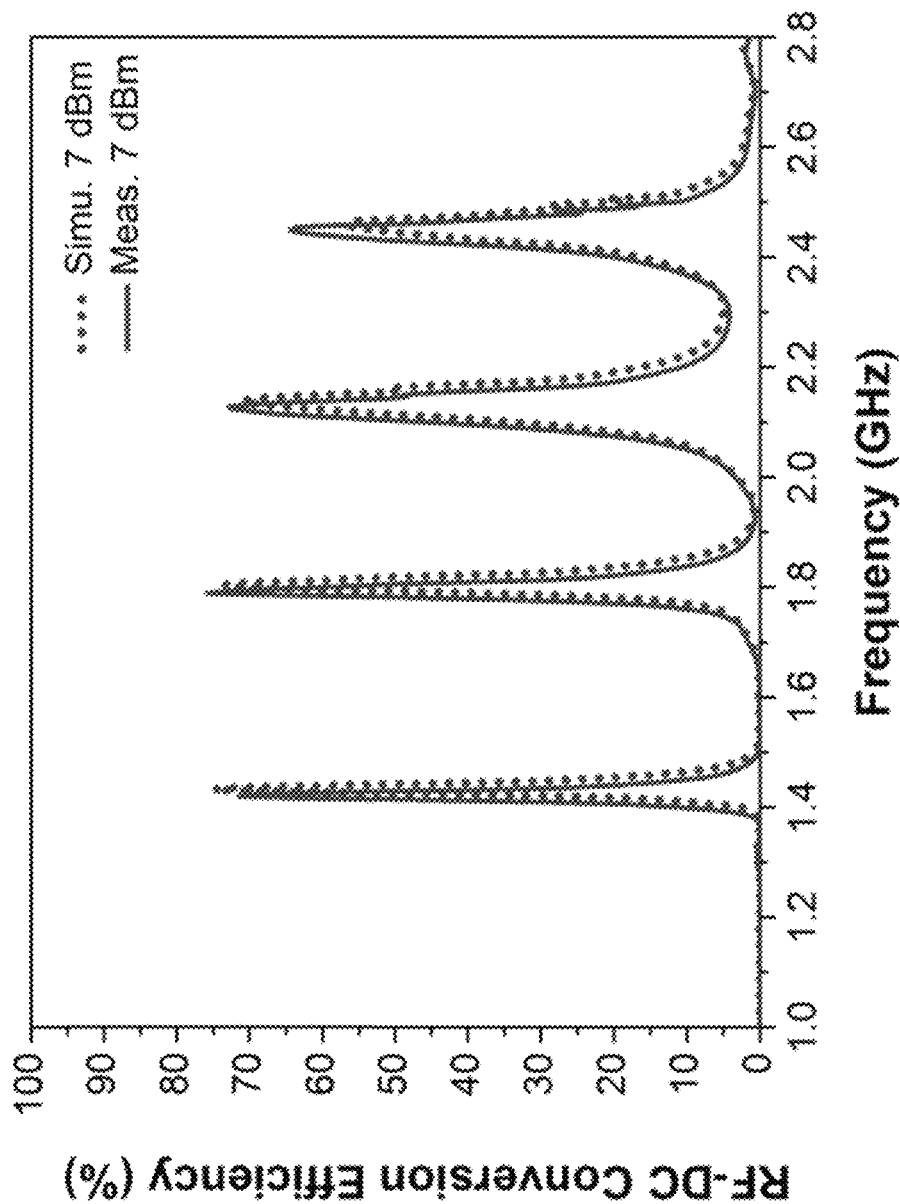
Figure 19C:
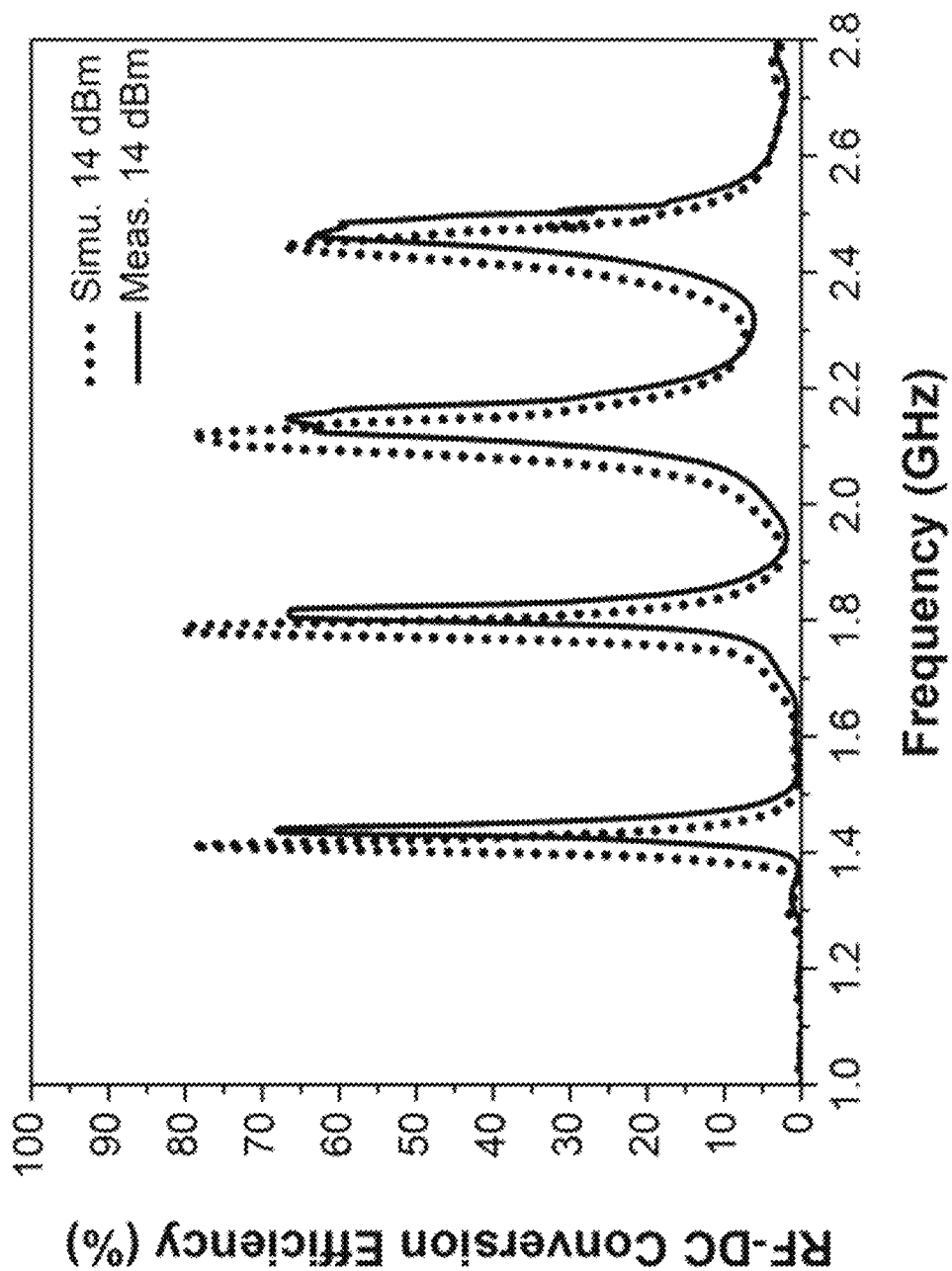

FIGS. 19A-C illustrate simulated and measured RF-to-DC conversion efficiencies of the OCFP rectenna layout depicted in FIG. 15. The OCFP rectenna demonstrates high RF-to-DC conversion efficiencies (e.g., over 60%) at four different operating frequency bands centered around approximately 1.45 GHz, 1.83 GHz, 2.15 GHz and 2.45 GHz with a bandwidth of operation of approximately 40 MHz-50 MHz, for each frequency band. The high RF-to-DC conversion efficiencies (e.g., over 60%) are seen to be maintained for three different input power levels ranging from 0 dBm up to 14 dBm for the simulated and the fabricated OCFP rectenna structure of FIG. 15, respectively. FIG. 19A shows simulated and measured RF-to-DC conversion efficiencies of near 60% for input power levels of approximately 0 dBm over the four frequency bands. FIG. 19B shows simulated and measured RF-to-DC conversion efficiencies varying between 60% up to 70% for input power levels of approximately 7 dBm over the four frequency bands. FIG. 19C shows simulated and measured RF-to-DC conversion efficiencies varying between 60% up to 80% for input power levels of approximately 14 dBm over the four frequency bands. A close correlation is seen between the simulated and measured RF-to-DC conversion efficiencies of the OCFP rectenna from the FIGS. 19A-C.

Figure 20:
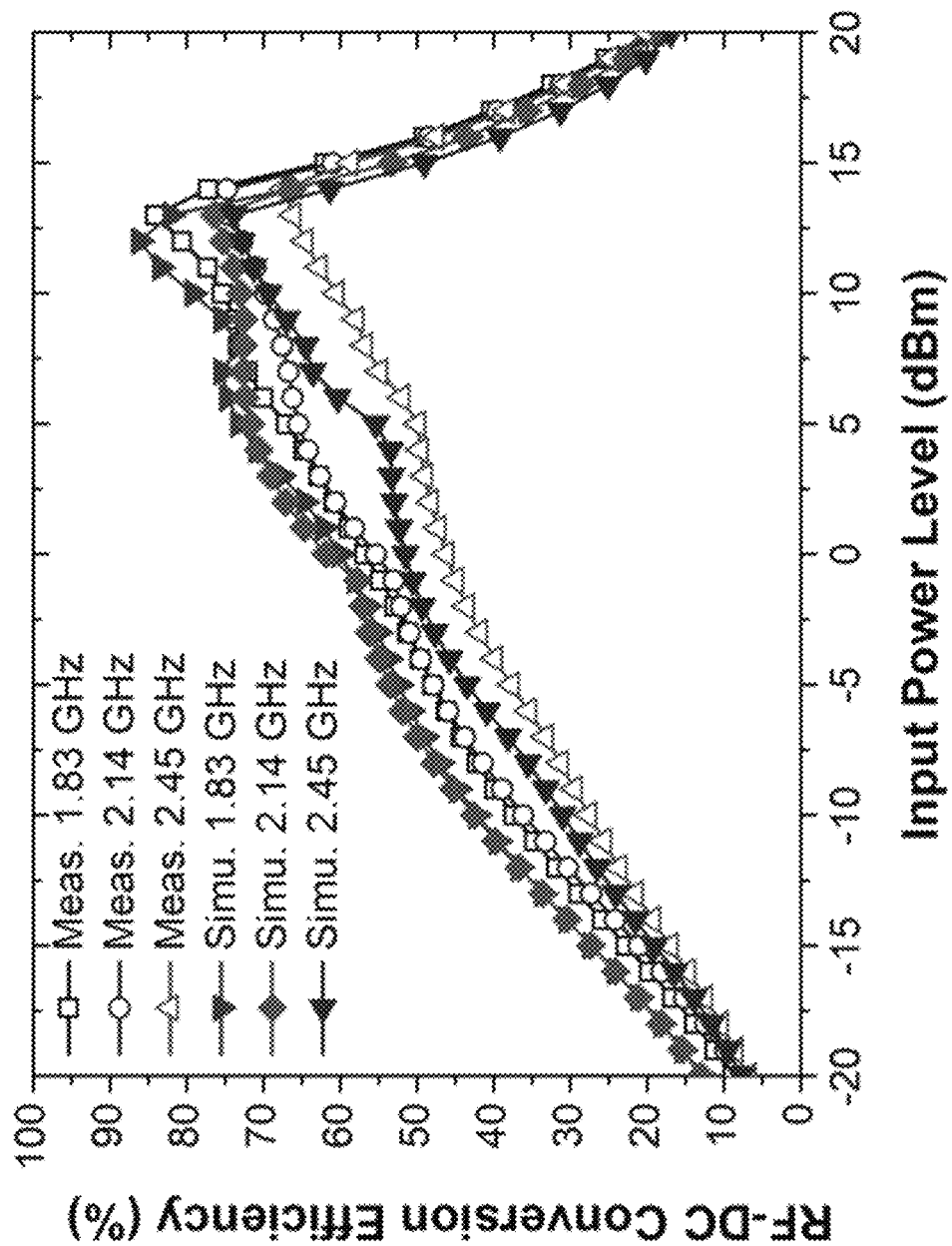
FIG. 20 illustrates simulated and measured conversion efficiencies for the OCFP rectenna versus different input power levels for three different frequency bands according to various embodiments.

FIG. 20 illustrates simulated and measured RF-to-DC conversion efficiencies, for the OCFP rectenna of FIGS. 15A-B, versus input power for three different operating frequency bands (e.g., GSM1800, UMTS2100 and Wi-Fi frequency bands that may correspond to frequency ranges of approximately 1.93 GHz-2.0 GHz, 2.1 GHz-2.2 GHz and 2.3 GHz-2.5 GHz, respectively, in the US, and approximately 1.8 GHz-1.9 GHz, 2.1 GHz-2.2 GHz and 2.3-2.5 GHz, respectively, in the EU and/or UK) of the OCFP rectenna. Additionally, there may be only two operating frequency bands (e.g., the Wi-Fi and cellular bands) of the OCFP rectenna. For enabling multi-band operation of the OCFP rectenna over different frequency ranges, the patch size of the OCFP antenna may be varied as described earlier with respect to FIG. 3A. Varying the patch size of the OCFP antenna may vary an overall frequency range of operation (e.g., 1.93 GHz-2.0 GHz, 2.1 GHz-2.2 GHz, 2.3 GHz-2.5 GHz, etc.) of the OCFP antenna while varying the pitch angle, feed line positioning, a number of holes and/or a number of shorting elements of the OCFP antenna may allow for finer tuning of the resonant frequencies of the OCFP antenna as described earlier with respect to FIGS. 3A-B, FIG. 4, and FIGS. 6A-D. The load resistance for simulation and experimental purposes is approximately 2000Ω. The RF-to-DC conversion efficiency is seen to be higher than 40% for input power varying between 0 dBm and 15 dBm. Maximum conversion efficiencies, for example, of around 85% at 1.83 GHz, 75% at 2.14 GHz and 70% at 2.45 GHz may be achieved for an input power level of around 12 dBm.

Figure 21:
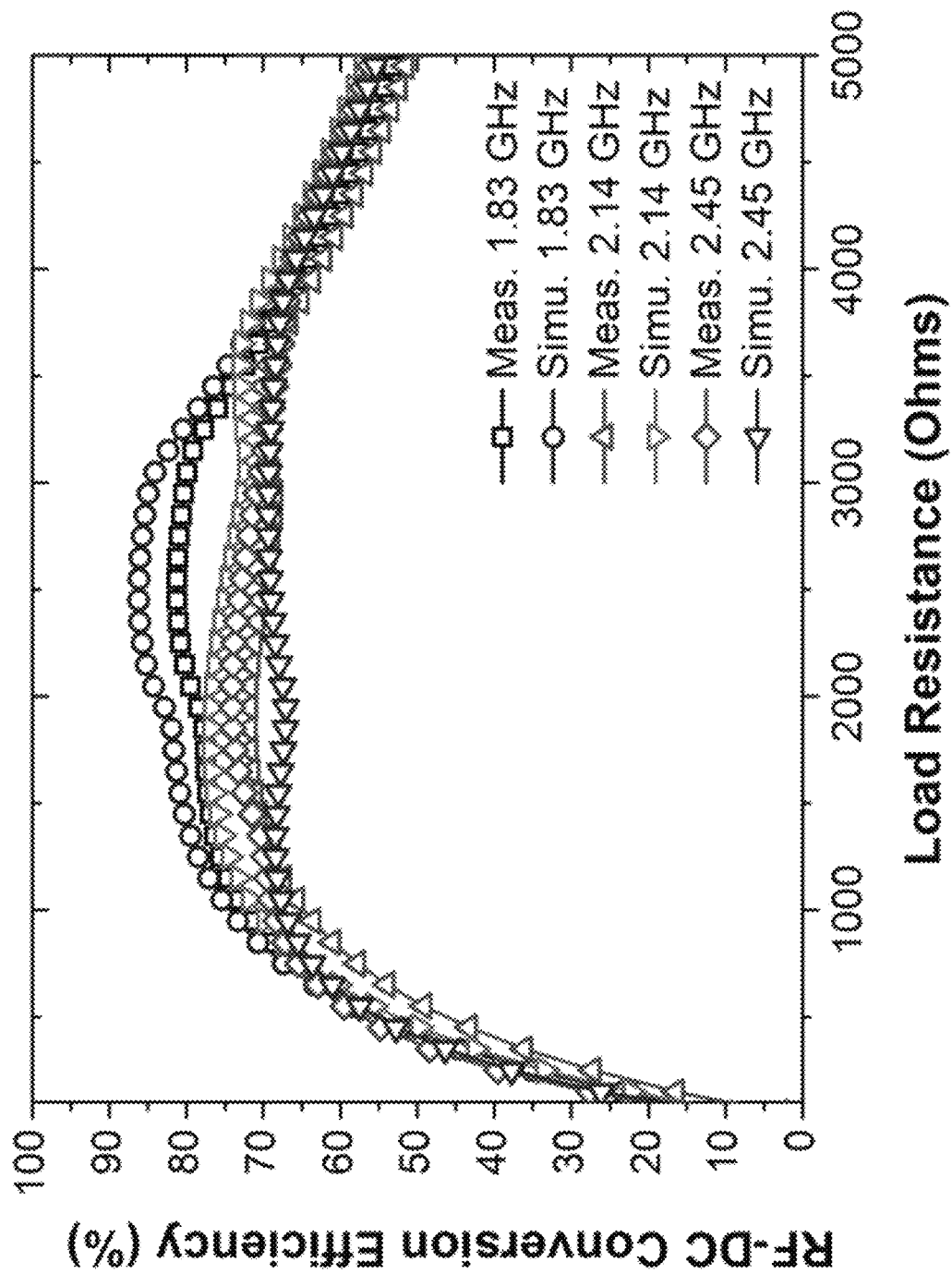
FIG. 21 illustrates simulated and measured conversion efficiencies for the OCFP rectenna versus load resistance for three different frequency bands.

FIG. 21 illustrates simulated and measured RF-to-DC conversion efficiencies, for the OCFP rectenna of FIGS. 15A-B, for three different operating frequencies of 1.83 GHz, 2.14 GHz and 2.45 GHz, for varying load resistances and a fixed input power of about 12 dBm. From FIG. 21, the simulated and measured RF-to-DC conversion efficiencies are seen to be consistently high (e.g., over 40%) for a large range of load resistances from 700Ω to 4500Ω and at the three operating frequencies of 1.83 GHz, 2.14 GHz and 2.45 GHz.

Although selected features of the embodiments have been shown and described, it is to be understood the embodiments are not limited to the described features. Instead, it is to be appreciated that changes may be made to these features without departing from the principles and spirit of the embodiments, the scope of which is defined by the claims and the equivalents thereof. Certain features that are described in this specification in the context of separate embodiments can also be implemented in combination in a single embodiment. Conversely, various features that are described in the context of a single embodiment can also be implemented in multiple embodiments separately or in any suitable subcombination.

The invention claimed is:

1. An apparatus comprising:
    an off-center-fed patch (OCFP) antenna configured to receive electromagnetic (EM) radiation, wherein the OCFP antenna comprises:
        a metal patch deposited on a substrate;
        a ground plane;
        at least two shorting elements configured to electrically connect the metal patch with the ground plane;
        two feed lines disposed on the substrate, each of the two feed lines connected at a first end to the metal patch at respective predefined pitch angles; and
        two rectifying circuits, each connected directly to a second end of a different one of the two feed lines, wherein first and second rectifying circuits of the two rectifying circuits are configured to convert lower and higher levels, respectively, of AC input power from the OCFP antenna to DC output power.

2. The apparatus of claim 1, wherein the at least two shorting elements are positioned symmetrically relative to a center of the OCFP antenna and at a common distance from the center of the OCFP antenna.

3. The apparatus of claim 1, wherein an impedance of the OCFP antenna is conjugate matched to an impedance of each of the two rectifying circuits.

4. The apparatus of claim 2, wherein the apparatus is configured to have at least two operating frequency bands between 1.0 GHz and 2.8 GHz.

5. The apparatus of claim 4, wherein a varation of the common distance varies a center frequency corresponding to each of the at least two operating frequency bands.

6. An apparatus comprising:
    an off-center-fed-patch (OCFP) antenna configured to receive a radio frequency (RF) signal, wherein the OCFP antenna comprises:
        a metal patch deposited on a substrate;
        a plurality of feed lines that individually align with a center of the metal patch and are disposed on the substrate, wherein a first end of each feed line of the plurality of feed lines connects to the metal patch at a common pitch angle, and wherein each feed line of the plurality of feed lines is connected to a different edge of the metal patch; and
        at least one pair of shorting elements configured to electrically connect the substrate and the metal patch, wherein each shorting element of the at least one pair of shorting elements is located at a common distance from the center of the metal patch; and
    a plurality of rectifying circuits connected one-to-one to the plurality of feed lines and configured to convert alternating current (AC) input power generated by the OCFP antenna to direct current (DC) output power, wherein first and second rectifying circuits of the plurality of rectifying circuits are configured to convert lower and higher levels, respectively, of the AC input power to the DC output power.

7. The apparatus of claim 6, wherein an impedance of the OCFP antenna is conjugate matched to an impedance of each of the plurality of rectifying circuits.

8. The apparatus of claim 6, wherein:
    the first rectifying circuit comprises a first diode and a first capacitor having one terminal connected directly to the first diode and another terminal connected to a first feed line of the plurality of feed lines;
    the second rectifying circuit comprises a second diode and a second capacitor having one terminal connected directly to the second diode and another terminal connected to a second feed line of the plurality of feed lines; and
    the first diode has a lower forward bias voltage than the second diode.

9. The apparatus of claim 6, wherein the apparatus is configured to have three operating frequency bands between 1.1 GHz and 2.7 GHz, and wherein the apparatus is configured to generate the DC output power for different input RF polarizations.

10. The apparatus of claim 9, wherein the three operating frequency bands are centered around approximately 1.95 GHz, 2.15 GHz and 2.45 GHz, respectively.

11. The apparatus of claim 10, wherein a center frequency corresponding to each of the three operating frequency bands is tunable by varying the common distance.

12. The apparatus of claim 10, wherein each of the three operating frequency bands comprises a bandwidth of at least 40 MHz.

13. The apparatus of claim 9, wherein the apparatus is configured to generate the DC output power at conversion efficiencies of at least 60%.

14. The apparatus of claim 13, wherein the apparatus is configured to generate the DC output power for levels of the AC input power ranging from approximately 0 dBm to 15 dBm.

15. The apparatus of claim 6, wherein the common distance is configurable to vary between approximately 5 mm and 25 mm.

16. The apparatus of claim 6, wherein each shorting element of the at least one pair of shorting elements comprises: a hole that is positioned at a different location in the metal patch, and a shorting conductor configured to be placed in the hole.

17. A method comprising:
    detecting, by a computing device, electromagnetic (EM) radiation at an off-center-fed patch (OCFP) antenna;
    determining, by the computing device, a plurality of frequencies corresponding to the EM radiation;
    tuning an impedance of the OCFP antenna based on the plurality of frequencies and based on adjusting a distance between one or more shorting elements of the OCFP antenna;
    verifying, by the computing device, conversion of the EM radiation into direct current (DC) power based on analyzing an output power of two rectifying circuits connected directly by respective feed lines to the OCFP antenna; and
    matching the impedance of the OCFP antenna to a conjugate impedance of each of the two rectifying circuits, wherein first and second rectifying circuits of the two rectifying circuits are configured to convert lower and higher levels, respectively, of AC input power from the OCFP antenna to the DC power.

18. The method of claim 17, wherein the tuning the impedance of the OCFP antenna is further based on determining one or more operating frequency bands ranging between 1.1 GHz and 2.7 GHz that correspond to the plurality of frequencies.

19. The apparatus of claim 6, wherein the apparatus is configured to have a maximum realized gain for cross-polarized and co-polarized RF signals of at least 8 dBi.

20. The apparatus of claim 1, wherein:
the first rectifying circuit comprises a first diode arranged to rectify the lower level of the AC input power; and
the second rectifying circuit comprises a second diode arranged to rectify the higher level of the AC input power, wherein the first diode has a lower breakdown voltage than the second diode.

21. The method of claim 17, wherein:
the first rectifying circuit comprises a first diode arranged to rectify the lower level of the AC input power; and
the second rectifying circuit comprises a second diode arranged to rectify the higher level of the AC input power, wherein the first diode has a lower breakdown voltage than the second diode.

* * * * *